(12) United States Patent
Takaoka

(10) Patent No.: US 9,121,712 B2
(45) Date of Patent: Sep. 1, 2015

(54) POSITION CALCULATION BASED ON TRAVELING PITCH AND SPEED

(71) Applicant: Sony Corporation, Tokyo (JP)

(72) Inventor: Tomohisa Takaoka, Kanagawa (JP)

(73) Assignee: SONY CORPORATION, Tokyo (JP)

(*) Notice: Subject to any disclaimer, the term of this patent is extended or adjusted under 35 U.S.C. 154(b) by 120 days.

(21) Appl. No.: 13/827,748

(22) Filed: Mar. 14, 2013

(65) Prior Publication Data

US 2013/0261962 A1    Oct. 3, 2013

(30) Foreign Application Priority Data

Mar. 30, 2012 (JP) ................................. 2012-080989

(51) Int. Cl.
| | | |
|---|---|---|
| G01C 21/00 | (2006.01) | |
| G01C 21/16 | (2006.01) | |
| G01S 19/49 | (2010.01) | |
| G01C 25/00 | (2006.01) | |
| G01C 21/26 | (2006.01) | |
| G01C 21/36 | (2006.01) | |
| G01C 22/00 | (2006.01) | |
| B60T 8/172 | (2006.01) | |

(52) U.S. Cl.
CPC .............. *G01C 21/16* (2013.01); *G01C 21/165* (2013.01); *G01C 21/26* (2013.01); *G01C 21/36* (2013.01); *G01C 22/006* (2013.01); *G01C 25/005* (2013.01); *G01S 19/49* (2013.01); *B60T 8/172* (2013.01); *B60T 2250/04* (2013.01)

(58) Field of Classification Search
CPC .... G01C 21/16; G01C 21/165; G01C 25/005; G01C 21/26; G01C 21/36; G01S 19/49; B60T 2250/04; B60T 8/172
USPC .................. 701/142, 400, 472, 500; 702/142
See application file for complete search history.

(56) References Cited

U.S. PATENT DOCUMENTS

| | | | |
|---|---|---|---|
| 6,658,354 B2* | 12/2003 | Lin ............................... | 701/454 |
| 7,841,966 B2* | 11/2010 | Aaron et al. ...................... | 482/8 |
| 8,134,499 B2* | 3/2012 | Wang et al. ................. | 342/357.3 |
| 2006/0106289 A1* | 5/2006 | Elser et al. .................... | 600/300 |
| 2011/0022357 A1* | 1/2011 | Vock et al. .................... | 702/182 |
| 2011/0035184 A1* | 2/2011 | Aaron et al. .................. | 702/158 |
| 2011/0238308 A1* | 9/2011 | Miller et al. ................. | 701/216 |
| 2012/0086606 A1* | 4/2012 | Mathews et al. ............. | 342/461 |

FOREIGN PATENT DOCUMENTS

| | | |
|---|---|---|
| JP | 2001-27545 | 1/2001 |
| JP | 2008-292295 | 12/2008 |

* cited by examiner

*Primary Examiner* — James Trammell
*Assistant Examiner* — Majdi Alsomiri
(74) *Attorney, Agent, or Firm* — Frommer Lawrence & Haug LLP; William S. Frommer

(57) ABSTRACT

There is provided an information processing apparatus including a traveling pitch acquiring section configured to acquire a current traveling pitch, and a speed acquiring section configured to acquire a current traveling speed extracted from an association table showing correspondence between a traveling pitch and a traveling speed based on the current traveling pitch.

11 Claims, 26 Drawing Sheets

(JOGGING MODE)

PITCH SPEED
FREE FALL WHILE USER IS IN THE AIR (NORMAL WALKING MODE)

(DISPLAY SCREEN WATCHING MODE)

POSTURE OF DEVICE
(ORIENTATION OF DISPLAY SCREEN)
ON/OFF OF DISPLAY SCREEN

POSITION CALCULATION BASED ON TRAVELING PITCH AND SPEED

BACKGROUND

The present disclosure relates to an information processing apparatus, an information processing method, and a program.

Information processing apparatuses have been come into wide use, which have positioning functions employing positioning systems using a positioning satellite such as a GPS (global positioning system) in order to acquire positional information. Systems having the positioning functions are usually limited to an application such as in-car navigation systems or others. Recent wide use of smart phones, however, promotes opportunities to employ positioning functions into portable terminal devices.

The positioning function using the positioning satellite is unavailable in a place where it is difficult to capture radio waves from the positioning satellite. To counter this, it has been suggested to provide a method to calculate current positional information based on the traveling distance and the traveling direction of a user if the positioning function using the positioning satellite becomes unavailable. For example, Japanese Patent Laid-Open No. 2001-27545 discloses a portable-type range finder that learns in advance a user's step length per traveling pitch from the number of steps and a traveling distance of the user, and finds the travel distance of the user based on the step length and the number of the steps. The traveling distance calculated from a difference in the GPS position is used for the learning of the step length. Japanese Patent Laid-Open No. 2008-292295 discloses a speedometer that learns a traveling pitch and a speed of a user by use of amplitude of acceleration.

SUMMARY

Unfortunately, in the calculation of the traveling distance from the difference in the positional information using the positioning satellite, accumulation of the traveling distance becomes greater than a true value, which amplitudes errors. If using the amplitude of the acceleration, the amplitude of the acceleration relies on the way that the user holds a terminal device while the learning operation is carried out, so that it is required to fix the terminal device at a particular place during the learning operation.

The present disclosure proposes an information processing apparatus, an information processing method, and a program capable of executing the learning regardless of the way that a user holds a terminal device, and capable of carrying out speed estimation for autonomous positioning with enhanced precision.

According to an embodiment of the present disclosure, there is provided an information processing apparatus including a traveling pitch acquiring section configured to acquire a traveling pitch, and a speed acquiring section configured to acquire a speed extracted from an association table showing correspondence between a traveling pitch and a speed based on the traveling pitch acquired on the traveling pitch acquiring section.

According to another embodiment of the present disclosure, there is provided an information processing method including acquiring a traveling pitch, and acquiring a speed extracted from an association table showing correspondence between a traveling pitch and a speed based on the acquired traveling pitch.

According to another embodiment of the present disclosure, there is provided a program allowing a computer to function as an information processing apparatus, the information processing apparatus including a traveling pitch acquiring section configured to acquire a traveling pitch, and a speed acquiring section configured to acquire a speed extracted from an association table showing correspondence between a traveling pitch and a speed based on the traveling pitch acquired on the traveling pitch acquiring section.

According to another embodiment of the present disclosure, there is provided an information processing apparatus including a traveling pitch acquiring section configured to acquire a traveling pitch, a speed acquiring section configured to acquire a speed calculated by use of a positioning satellite, and a table generating section configured to generate an association table showing correspondence between the traveling pitch and the speed.

According to another embodiment of the present disclosure, there is provided an information processing apparatus including a traveling pitch acquiring section configured to acquire a traveling pitch, a speed acquiring section configured to acquire a speed calculated by use of a positioning satellite, and a table generating section configured to generate an association table showing correspondence between the traveling pitch and the speed.

According to another embodiment of the present disclosure, there is provided an information processing method including acquiring a traveling pitch, acquiring a speed calculated by use of a positioning satellite, and generating an association table showing correspondence between the traveling pitch and the speed.

According to another embodiment of the present disclosure, there is provided a program allowing a computer to function as an information processing apparatus, the information processing apparatus including a traveling pitch acquiring section configured to acquire a traveling pitch, a speed acquiring section configured to acquire a speed calculated by use of a positioning satellite, and a table generating section configured to generate an association table showing correspondence between the traveling pitch and the speed.

As described above, the present disclosure can propose an information processing apparatus, an information processing method, and a program capable of executing the learning regardless of the way that a user holds a terminal device, and capable of carrying out speed estimation for autonomous positioning with enhanced precision.

DETAILED DESCRIPTION OF THE EMBODIMENTS

Figure 1:
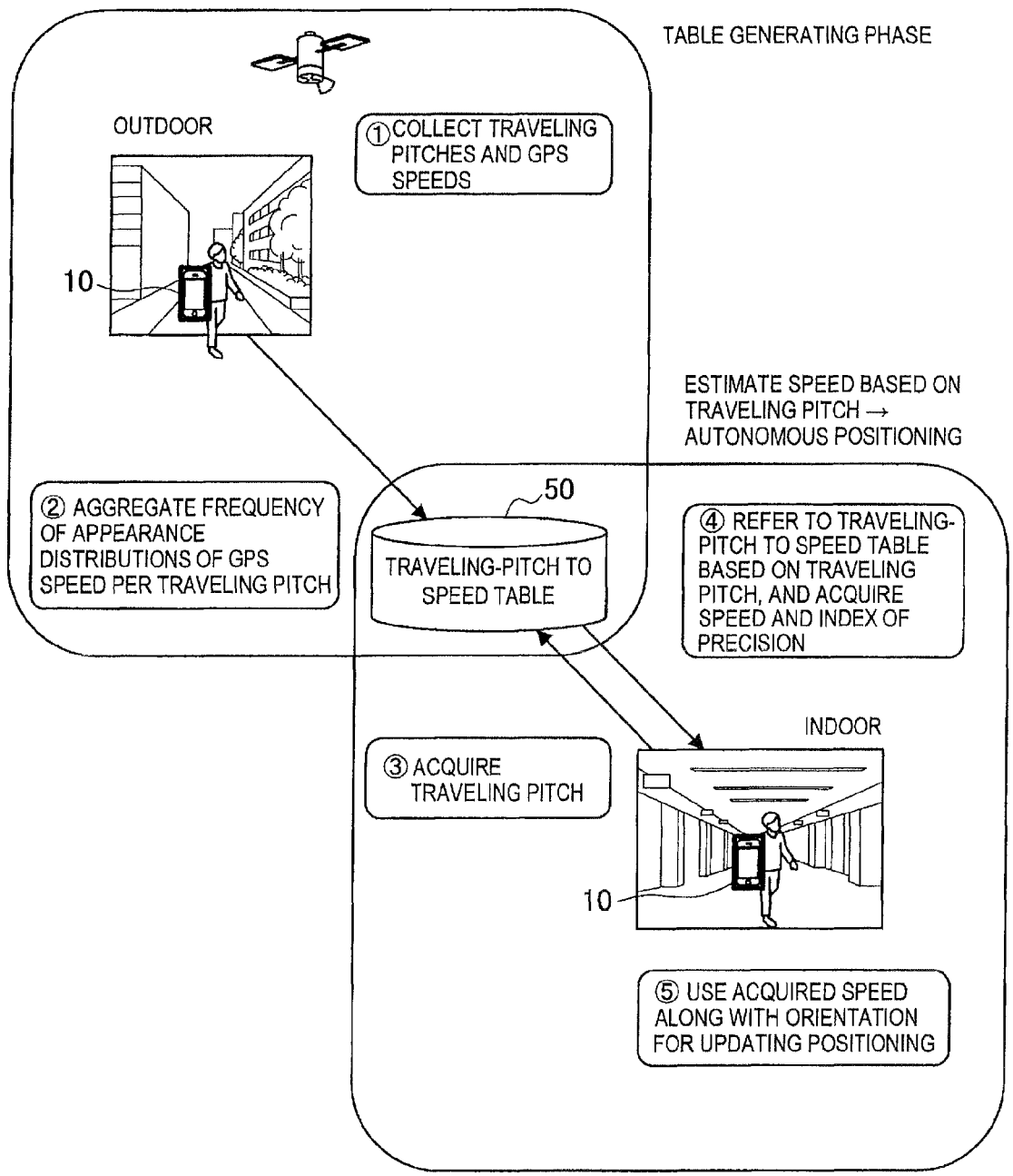
FIG. 1 is a drawing explaining an outline of an information processing system according to one embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be provided in the following order.
1. Outline
2. First embodiment
　2-1. Example of functional configuration
　2-2. Example of operation
3. Second embodiment
　3-1. Example of functional configuration
　3-2. Example of operation
4. Third embodiment
　4-1. Example of functional configuration
　4-2. Example of operation
5. Example of hardware configuration <1. Outline>

Referring to FIG. 1, description will be provided on an outline of the information processing system according to one embodiment of the present disclosure. The present embodiment will be described by using an example in which an acquired traveling speed is used for the position measurement, but the applicable range of the present technology is not limited to this example. An application of the present technology other than the position measurement will be described later. FIG. 1 is a drawing explaining an outline of the information processing system according to one embodiment of the present disclosure.

In the present specification and drawings, plural structural elements having substantially the identical functional configuration may be distinguished by adding different alphabets after the identical reference numerals. The plural structural elements having substantially the same functional configuration may be distinguished into a portable terminal $10a$ and a portable terminal $10b$ if necessary, for example. If the plural structural elements having substantially the same functional configuration is unnecessary to be distinguished from each other, only the identical reference numeral is used. For example, if it is unnecessary to distinguish the portable terminal into the portable terminal $10a$ and the portable terminal $10b$, the portable terminal is simply referred to as the portable terminal 10.

The portable terminal 10 collects traveling pitches and GPS speeds in a place in a preferable GPS receiving environment which is mostly the outdoor. The collected traveling pitches and GPS speeds are stored on a traveling-pitch to speed table 50 as frequency of appearance distributions of the GPS speed for every traveling pitch.

Meanwhile, in an unfavorable GPS receiving environment such as the indoor, the portable terminal 10 can acquire a current traveling speed of the user using this traveling-pitch to speed table. There is correspondence between the traveling speed and the traveling pitch. Hence, the portable terminal 10 acquires the traveling pitch of the user through an acceleration sensor or the like, and refers to the traveling-pitch to speed table 50 so as to acquire a speed and an index of precision corresponding to the traveling pitch. The portable terminal 10 can use the speed acquired in this manner along with an orientation of the user acquired in a different manner for updating the positioning.

The traveling-pitch to speed table may be stored on a storage section in the portable terminal 10. The traveling-pitch to speed table may be stored in a server device separate from the portable terminal 10, instead.

In this case, as described above, the correspondence between each speed acquired from the positioning satellite such as the GPS speed and each traveling pitch is learned. There is another method of learning the correspondence between the step length or the speed and the traveling pitch using the traveling distance that is calculated based on the difference in the GPS position, for example. The accumulated distance acquired from the difference in the GPS position is always greater than a true value. To the contrary, the distance obtained based on the GPS positional speed is dispersed from the true value. The GPS position is likely to be subjected to influence of multipath, but the GPS speed is more unlikely to be subjected to the influence of multipath, so that the accuracy of the GPS speed is often more unlikely to be deteriorated compared to that of the GPS position even in the environment that easily causes multipath such as a place crowded with buildings. Accordingly, the GPS speed has less accumulation error than the GPS position, so that enhancement of accuracy of the autonomous positioning can be expected.

Compared to the case of calculating the speed through the step length, the case of directly using the speed through the positioning satellite can achieve an effect to reduce time required for the learning of the table.

<2. First Embodiment>

[2-1. Example of Functional Configuration]

Figure 2:
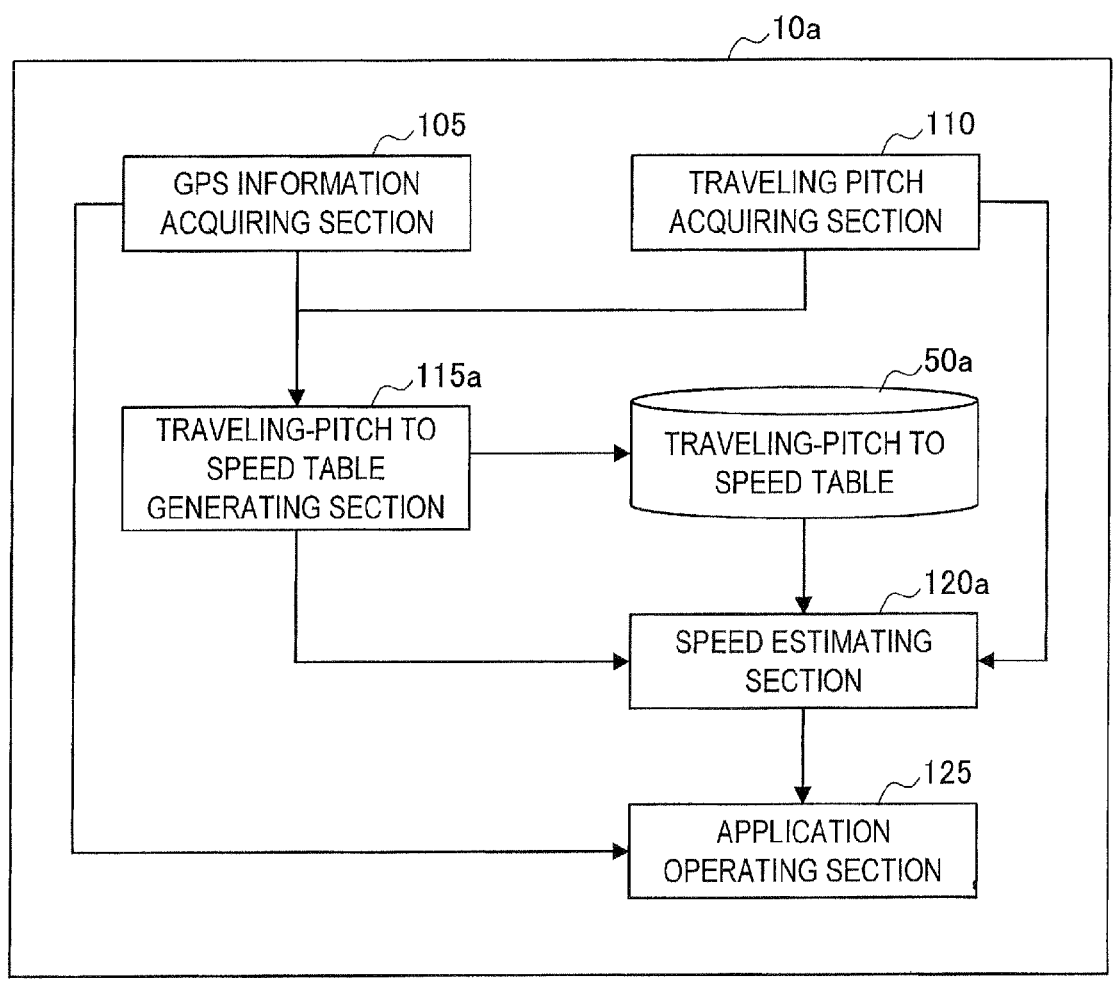
FIG. 2 is a block diagram showing a functional configuration of a portable terminal according to the first embodiment of the present disclosure.
Figure 3:
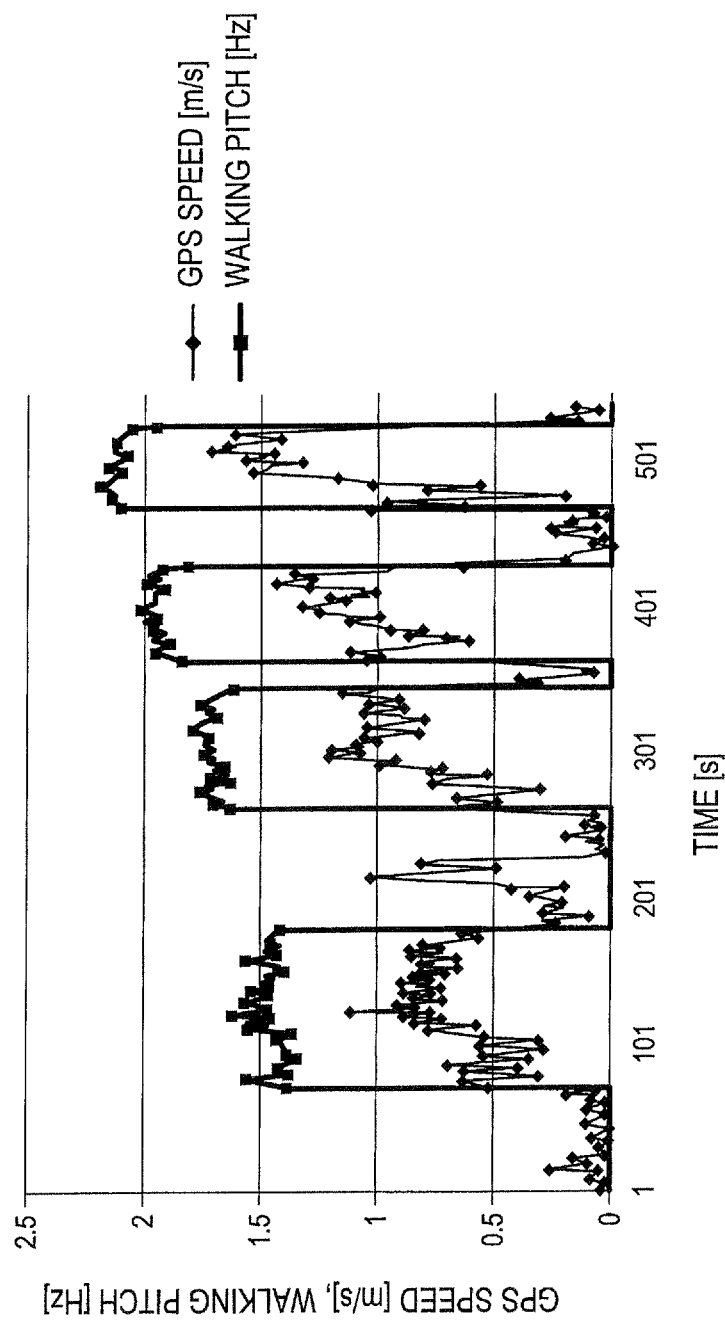
FIG. 3 is a graph showing an example of measurement data regarding a GPS speed and a walking pitch acquired by the portable terminal according to the present embodiment.
Figure 4:
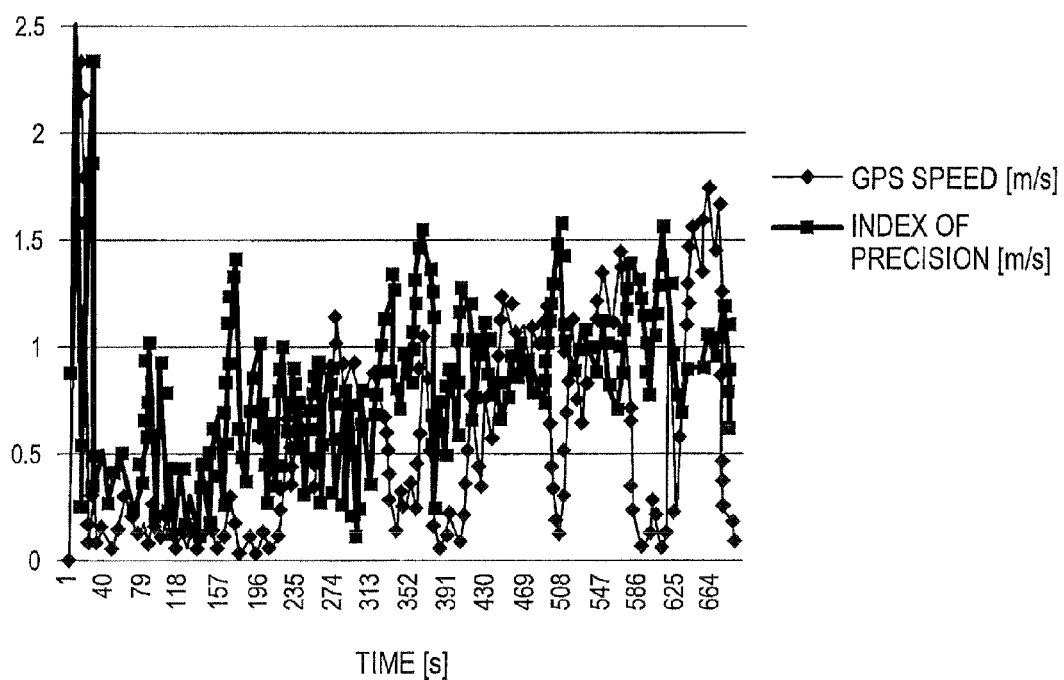
FIG. 4 is a graph showing an example of the GPS speeds and indexes of precision thereof that are acquired by the portable terminal according to the present embodiment.
Figure 5:
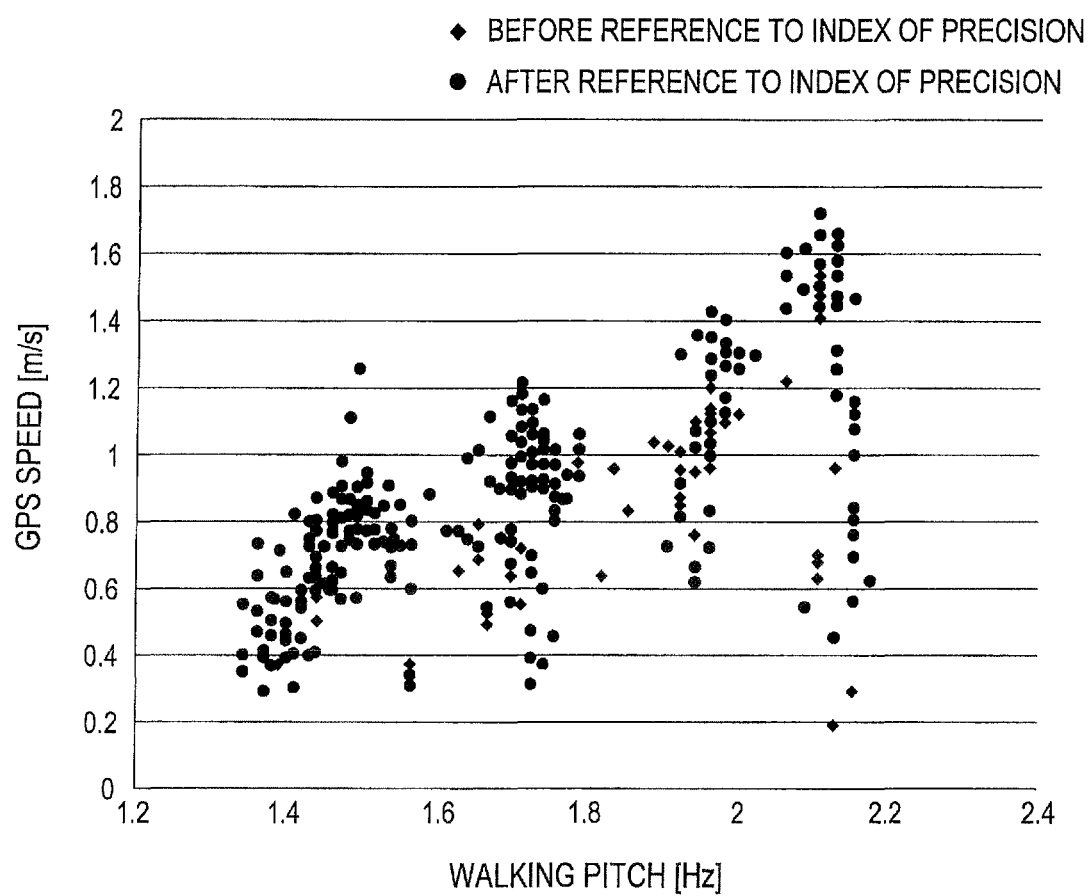
FIG. 5 is a graph explaining filtering with the index of precision of the GPS speed acquired by the portable terminal according to the present embodiment.
Figure 6:
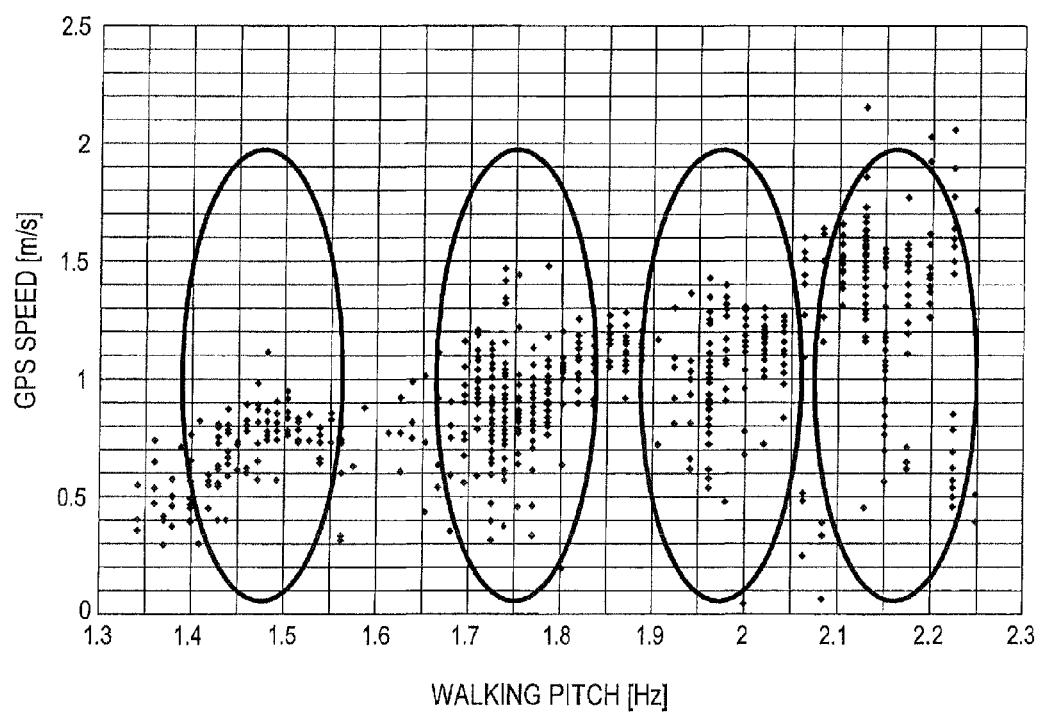
FIG. 6 is a graph showing an example of data regarding the walking pitch and the GPS speed that are acquired by the portable terminal according to the present embodiment.
Figure 7:
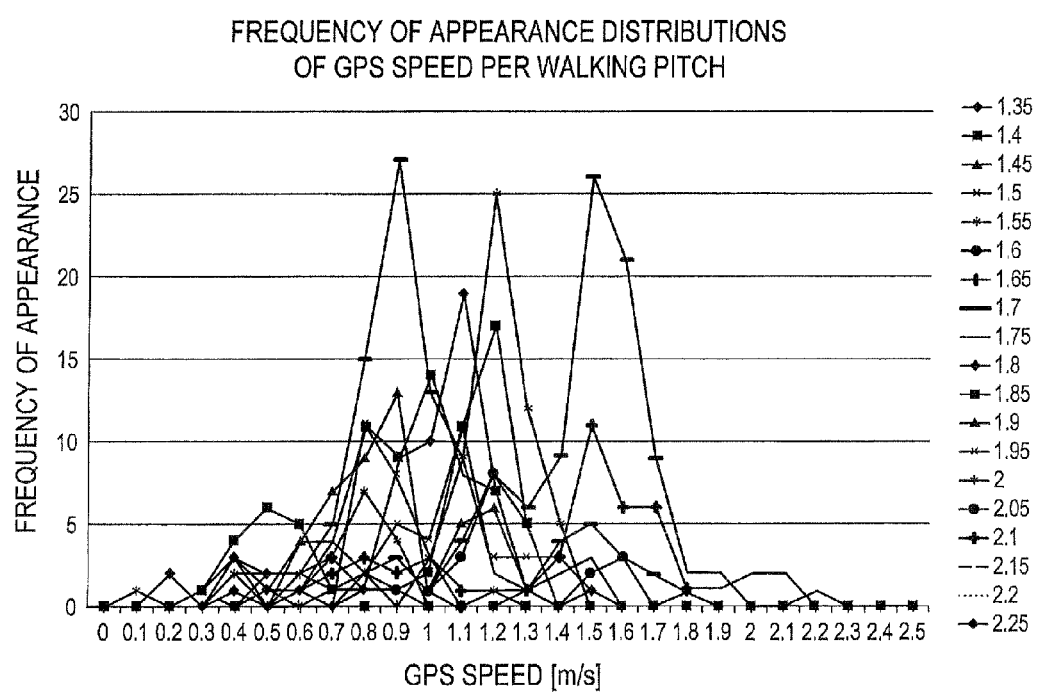
FIG. 7 is a graph showing frequency of appearance distributions of the GPS speed per walking pitch generated by the portable terminal according to the present embodiment.
Figure 8:
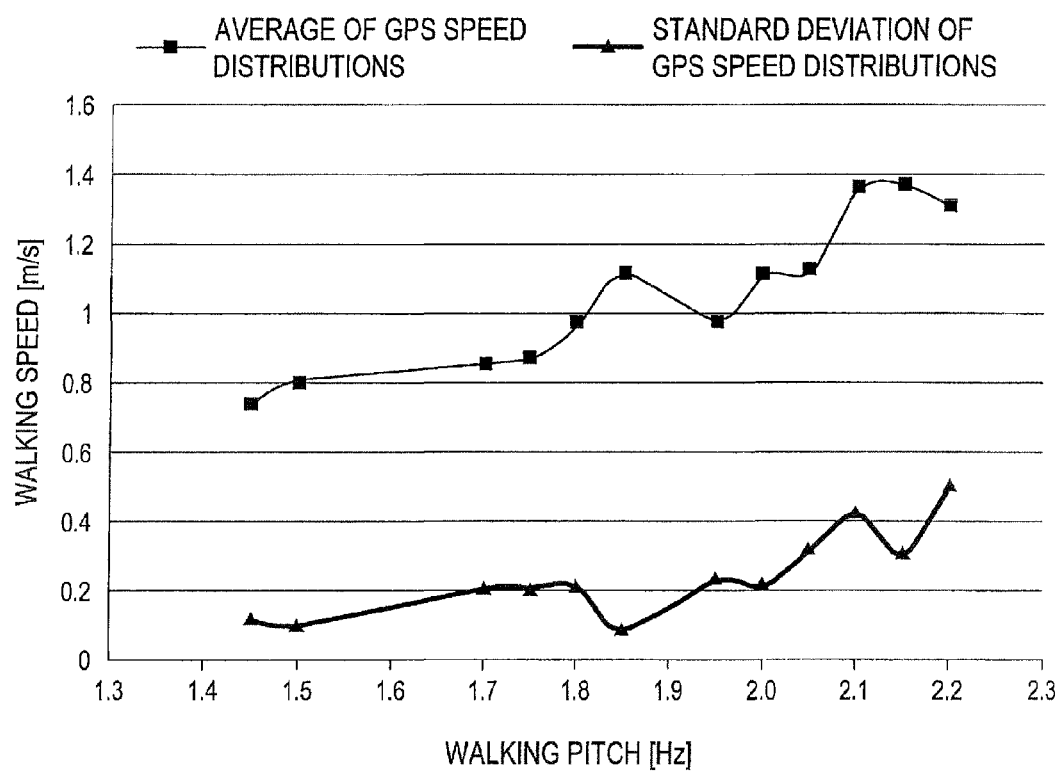
FIG. 8 is a graph showing one example of an association table between the walking pitch and the walking speed that are generated by the portable terminal according to the present embodiment.
Figure 9:
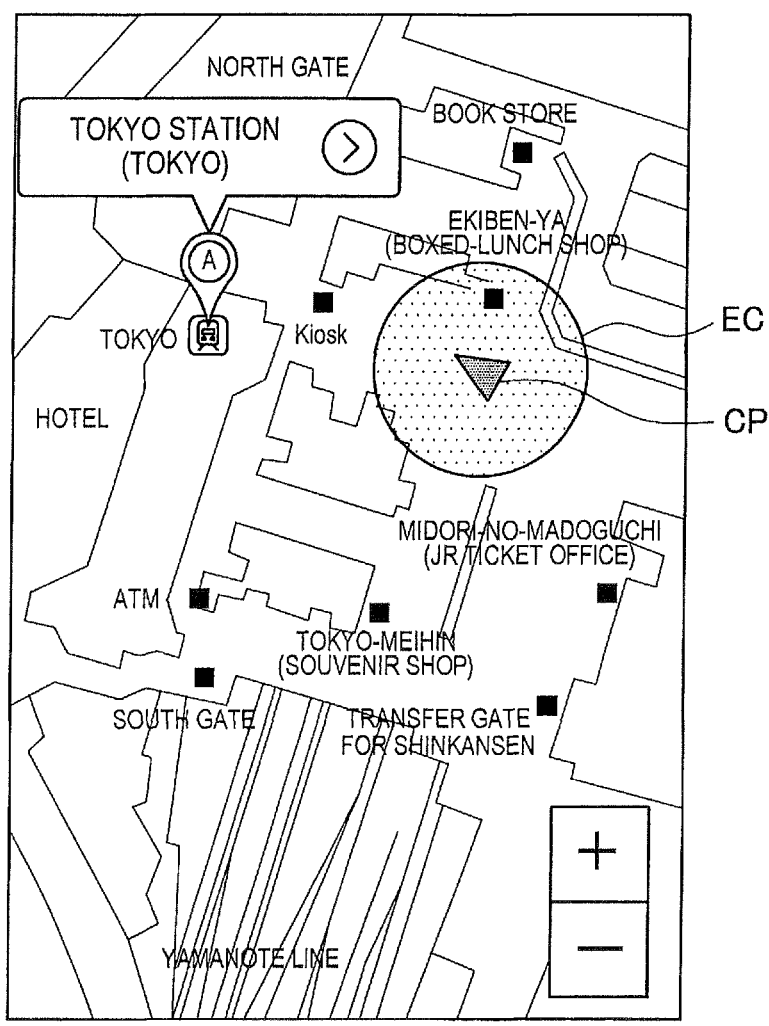
FIG. 9 is a drawing of explaining one example of a display screen displayed by the portable terminal according to the present embodiment.

Referring to FIG. 2 to FIG. 9, the portable terminal 10a according to the first embodiment of the present disclosure will be described as follows. FIG. 2 is a block diagram showing a functional configuration of the portable terminal according to the first embodiment of the present disclosure. FIG. 3 is a graph showing an example of measurement data regarding the GPS speed and the walking pitch acquired by the portable terminal according to the present embodiment. FIG. 4 is a graph showing an example of the GPS speeds and the indexes of precision thereof that are acquired by the portable terminal according to the present embodiment. FIG. 5 is a graph explaining filtering with the index of precision of the GPS speed acquired by the portable terminal according to the present embodiment. FIG. 6 is a graph showing an example of data regarding the walking pitch and the GPS speed that are acquired by the portable terminal according to the present embodiment. FIG. 7 is a graph showing frequency of appearance distributions of the GPS speed per walking pitch generated by the portable terminal according to the present embodiment. FIG. 8 is a graph showing one example of an association table between the walking pitch and the walking speed that are generated by the portable terminal according to the present embodiment. FIG. 9 is a drawing of explaining one example of a display screen displayed by the portable terminal according to the present embodiment.

The portable terminal 10a according to the first embodiment of the present disclosure mainly includes a GPS information acquiring section 105, a traveling pitch acquiring section 110, a traveling-pitch to speed table generating section 115a, a speed estimating section 120, an application operating section 125, and a traveling-pitch to speed table 50a.

The portable terminal 10a is a portable-type information processing apparatus such as a mobile phone including a smart phone, a game machine, an image processing device, a music reproducing device, a navigation system, and a PC (personal computer).

(GPS Information Acquiring Section 105)

The GPS information acquiring section 105 is an example of an acquiring section for acquiring information by use of a positioning satellite, and has a function of acquiring information through a GPS satellite. The GPS information acquiring section 105 may include a GPS antenna for receiving a GPS signal and a signal processing section for processing the received GPS signal, for example. The GPS information acquiring section 105 can acquire the GPS position and the GPS speed, for example. The GPS information acquiring section 105 can supply the acquired information to the traveling-pitch to speed table generating section 115 and to the application operating section 125. The GPS speed supplied by the GPS information acquiring section 105 is a speed calculated using the Doppler frequency. For example, some GPS receivers find the GPS speed through the Kalman filter by using the positional difference along with the Doppler frequency. The GPS speed to be supplied by this GPS information acquiring section 105 is preferably a speed obtained by using the Doppler frequency.

(Traveling Pitch Acquiring Section 110)

The traveling pitch acquiring section 110 has a function of acquiring the traveling pitch of the user. The traveling pitch acquiring section 110 can count the number of steps of the user from swing detecting data acquired through the acceleration sensor or the like, and divide the number of the steps by the traveling time, so as to find the traveling pitch, for example. The traveling pitch acquiring section 110 can supply the acquired traveling pitch for the traveling-pitch to speed table generating section 115 and the speed estimating section 120a.

(Traveling-Pitch to Speed Table Generating Section 115a)

The traveling-pitch to speed table generating section 115a is an example of the table generating section for generating an association table showing correspondence between each GPS speed and each traveling pitch. The traveling-pitch to speed table generating section 115a acquires the GPS speed and the walking pitch shown in FIG. 3, for example, while the user is walking. Note that the data shown herein is acquired by intentionally changing the walking pitch in a sequential order for the experiment, but the traveling-pitch to speed table generating section 115a may generate the association table based on data acquired from natural walking with no intention. Since neither the walking pitch nor the GPS speed rely on the way that the user holds the portable terminal 10a, the portable terminal 10a may be held in any manner.

The traveling-pitch to speed table generating section 115a can filter the data acquired in this manner by use of the index of precision. For example, focused on the index of precision regarding the data shown in FIG. 3, FIG. 4 shows the index of precision for each GPS speed. In this case, the GPS speed having the index of precision of 1 (m/s) or more is removed through the filtering, for example. FIG. 5 shows the data distributions of the GPS speed before and after the reference to the index of precision in association with the walking pitch. In this example, the data indicated by rectangular shaped plots are data to be removed as abnormal values having the index of precision of 1 (m/s) or more. Hence, in the subsequent process, the data after the reference to the index of precision, which is indicated by round plots in FIG. 5, are used.

Subsequently, the traveling-pitch to speed table generating section 115a aggregates the collected data. As shown in FIG. 6, for example, the walking pitches and the GPS speeds are divided into aggregating sections, and accumulated frequency is calculated in each divided section. The aggregating sections may be fixed, or may be variable with a cluster analysis method. For example, four sections having high sample densities are surrounded by circles in FIG. 6, for example. In the case of using the variable aggregating sections, the aggregation is executed after data of measurable samples are accumulated.

The traveling-pitch to speed table generating section 115a aggregates the frequency of appearance distributions of the GPS speed for each divided aggregating section. FIG. 7 shows the frequency of appearance distributions of the UPS speed per walking pitch. Based on this frequency of appearance distributions, the traveling-pitch to speed table generating section 115a may define a representative value for each section as the traveling speed for the traveling pitch of interest. For example, an average value, a mode value, and a median value may be used as the representative value for the section of interest. The traveling-pitch to speed table generating section 115a can calculate the index of precision for each traveling speed. The traveling-pitch to speed table generating section 115a may use the number of samples for the section of interest, or a value representing a dispersion of the samples for the section of interest as the index of precision thereof, for example. As the value representing the dispersion of the samples, values may be used such as a variance, a standard deviation, and an existence width of x % having a representative value as the central value, for example. FIG. 8 shows an example of the correspondence between the traveling pitch and the walking speed, and the index of precision for the correspondence if the average value is used for the traveling speed, and the standard deviation is used for the index of precision. The timing when the traveling-pitch to speed table generating section 115a executes the aggregation of the frequency of appearance distributions of the GPS speed may be determined based on the number of the samples. For example, if the number of the samples becomes increased by x samples in a certain section from the previous aggregation, the traveling-pitch to speed table generating section 115a may re-aggregate the distributions for this section.

(Speed Estimating Section 120a)

The speed estimating section 120a has a function of estimating the speed of the user by use of the traveling-pitch to speed table 50. Based on the traveling pitch acquired by the traveling pitch acquiring section 110, the speed estimating section 120a can extract a speed corresponding to the traveling pitch from the traveling-pitch to speed table 50. The speed estimating section 120a can further extract an index of precision corresponding to this speed. The speed estimating section 120a can supply the estimated speed and the index of precision for the application operating section 125.

(Application Operating Section 125)

The application operating section 125 has a function of operating by use of the estimated traveling speed of the user. The application operating section 125 may have a function of executing the autonomous positioning by use of the estimated traveling speed of the user. At this time, the application operating section 125 can use the walking autonomous positioning in the indoor, for example, if the GPS positioning is unavailable. The application operating section 125 can function as a display controlling section for overlappingly displaying on a map the user's position calculated based on the autonomous positioning. For example, the application operating section 125 can estimate the positioning error with the index of precision for the used speed. The application operating section 125 can operate based on this positioning error. For example, the application operating section 125 can extend duration time of the walking autonomy if the precision is preferable, that is, the positional error is small. The application operating section 125 can display a positional error with a positional error circle EC whose center is a current position CP as shown in FIG. 9. Since the positional error is usually accumulated, the application operating section 125 gradually increases the radius of the positional error circle EC with time, and variation of this radius can be controlled based on the index of precision for the speed. Specifically, if the index of precision for the speed is preferable, the time for increasing the radius of the positional error circle EC can be extended.

The application operating section 125 may have a function as an active mass sensor. The application operating section 125 can calculate the traveling distance based on the estimated speed in an area where the GPS is unavailable. The application operating section 125 may calculate used calories by use of the traveling distance calculated based on the estimated speed.

The speed estimated by the speed estimating section 120a may be used by the GPS receiver, for example. This speed may be used to support a high sensitive search of the satellite, for example. In order to search for a signal of the satellite with high sensitive in a situation in which the GPS positioning is unavailable, the Doppler frequency of each satellite is calculated based on the traveling speed and the orientation, so as to narrow down the search frequency. The high sensitive search can be carried out by inputting into the GPS receiver the traveling speed obtained by the present technology and the orientation obtained with a different method. This traveling speed may be used for a tracking support of the satellite. It is difficult to carry out the frequency tracking of the satellite in the GPS receiver in a weak signal environment. By supplying the GPS receiver with the traveling speed obtained by the present technology and the orientation obtained with the different method, the Doppler frequency of the satellite can be calculated so that the stable tracking can be maintained, which stabilizes the GPS position in the weak signal environment.

Heretofore, examples of functions of the portable terminal 10a according to the present embodiment have been shown. Each of the above structural elements may be configured using general-purpose members or circuits, or may be configured using hardware specialized for the function of each structural element. Further, the function of each structural element may be realized by reading, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing respective functions of the portable terminal 10a according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

[2-2. Example of Operation]

Figure 10:
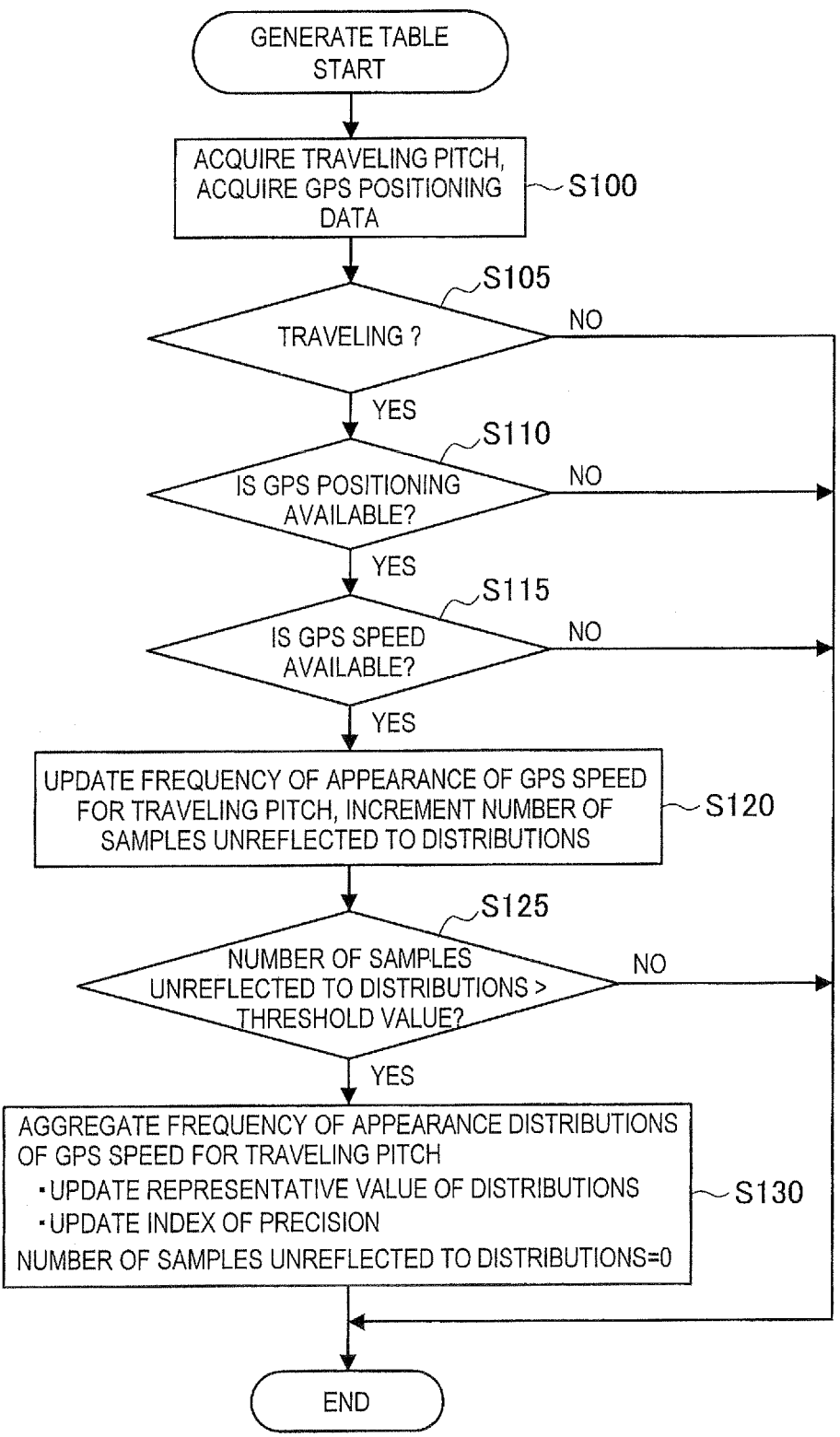
FIG. 10 is a flow chart showing a table generating operation of the portable terminal according to the present embodiment.
Figure 11:
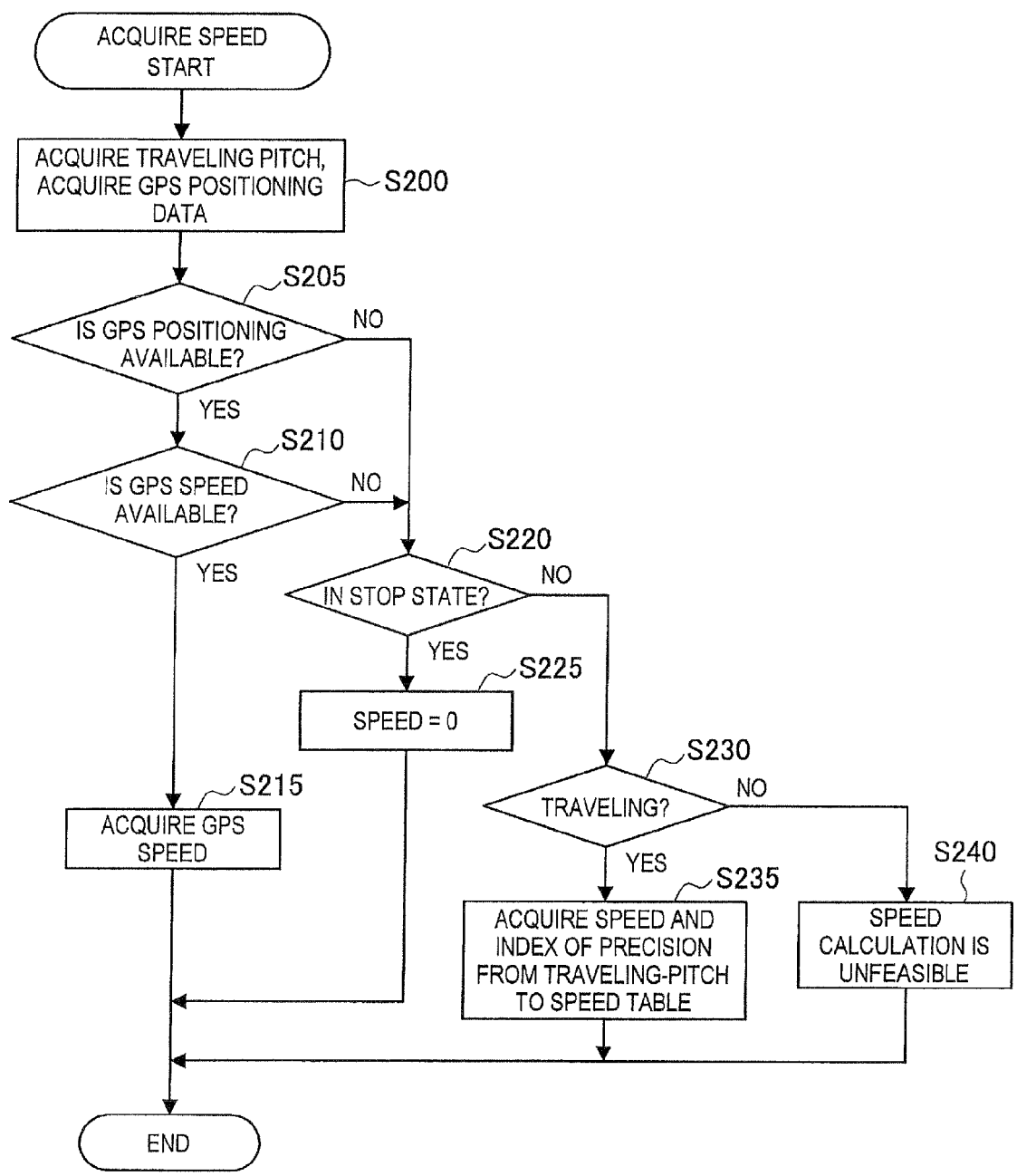
FIG. 11 is a flow chart showing a speed acquiring operation of the portable terminal according to the present embodiment.

Referring to FIG. 10 and FIG. 11, description will be provided on an example of the operation of the portable terminal 10a according to the first embodiment of the present disclosure. FIG. 10 is a flow chart showing the table generating operation of the portable terminal according to the present embodiment. FIG. 11 is a flow chart showing the speed acquiring operation of the portable terminal according to the present embodiment.

(Table Generating Operation)

Referring to FIG. 10, the table generating operation of the portable terminal 10a is shown. The portable terminal 10a acquires the current traveling pitch on the traveling pitch acquiring section 110, and acquires the GPS positioning data on the GPS information acquiring section 105 (S100). The traveling-pitch to speed table generating section 115a determines whether or not the user is traveling (S105). For example, the determination in step S105 may be made based on the swing detecting data on the acceleration sensor or the like. The determination in step S105 may be made based on the positional information acquired on the GPS information acquiring section 105, instead. The traveling-pitch to speed table generating section 115a determines whether or not the GPS positioning is available at the current position (S110). Subsequently, the traveling-pitch to speed table generating section 115a determines whether or not the GPS speed is available (S115).

If it is determined that the user is traveling, the GPS positioning is available, and the GPS speed is available in the determinations in steps S105, S110, and S115, the traveling-pitch to speed table generating section 115a updates the frequency of appearance of the GPS speed for the traveling pitch, and increments the number of the samples unreflected to the distributions (S120).

At this time, the traveling-pitch to speed table generating section 115a determines whether or not the number of the samples unreflected to the distributions is more than a threshold value (S125). If the number of the samples unreflected to the distributions is more than the threshold value, the traveling-pitch to speed table generating section 115a aggregates the frequency of appearance distributions of the GPS speed for each traveling pitch (S130). At this time, the representative value of the distributions and the index of precision are updated, and the number of the samples unreflected to the distributions is reset to be zero.

(Speed Acquiring Processing)

Description will now be provided on the speed acquiring processing by the speed estimating section 120a with reference to FIG. 11. The speed estimating section 120a acquires the traveling pitch from the traveling pitch acquiring section 110, and acquires the GPS positioning data from the GPS information acquiring section 105 (S200).

Now, the speed estimating section 120a determines whether or not the GPS positioning is available (S205). If the GPS positioning is available, the speed estimating section 120a then determines whether or not the GPS speed is available (S210). If it is determined that the GPS speed is available, the speed estimating section 120a acquires the GPS speed, and defines this GPS speed as the traveling speed of the user (S215).

On the other hand, if it is determined that the GPS positioning is unavailable in step S205, or if it is determined that the GPS speed is unavailable in step S210, the speed estimating section 120a determines whether or not the user is in a stop state (S220). This determination in step S220 may be made based on the swing detecting data acquired on the acceleration sensor or the like, for example. If the user is determined to be in the stop state, the speed estimating section 120a sets the speed of the user to be zero (S225). On the other hand, if it is determined that the user is out of the stop state in step S220, the speed estimating section 120a then determines whether or not the user is traveling (S230). If the user is determined to be traveling in this step, the speed estimating section 120a can acquire the speed and the index of precision based on the traveling pitch from the traveling-pitch to speed table (S235). If it is determined that the user is not traveling in step S230, the speed estimating section 120a determines that the calculation of the speed is unfeasible (S240).

<3. Second Embodiment>
[3-1. Example of Functional Configuration]

Figure 12:
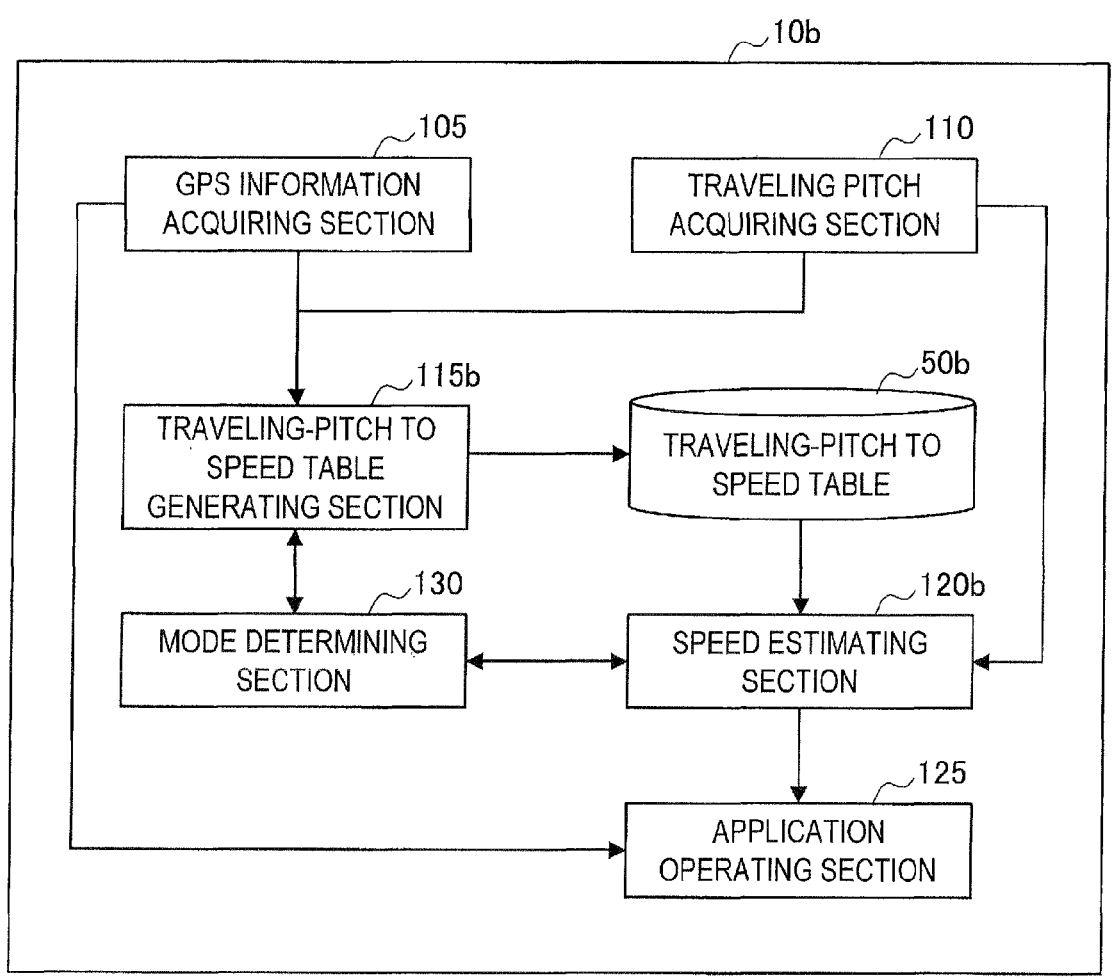
FIG. 12 is a block diagram showing a functional configuration of a portable terminal according to the second embodiment of the present disclosure.
Figure 13:
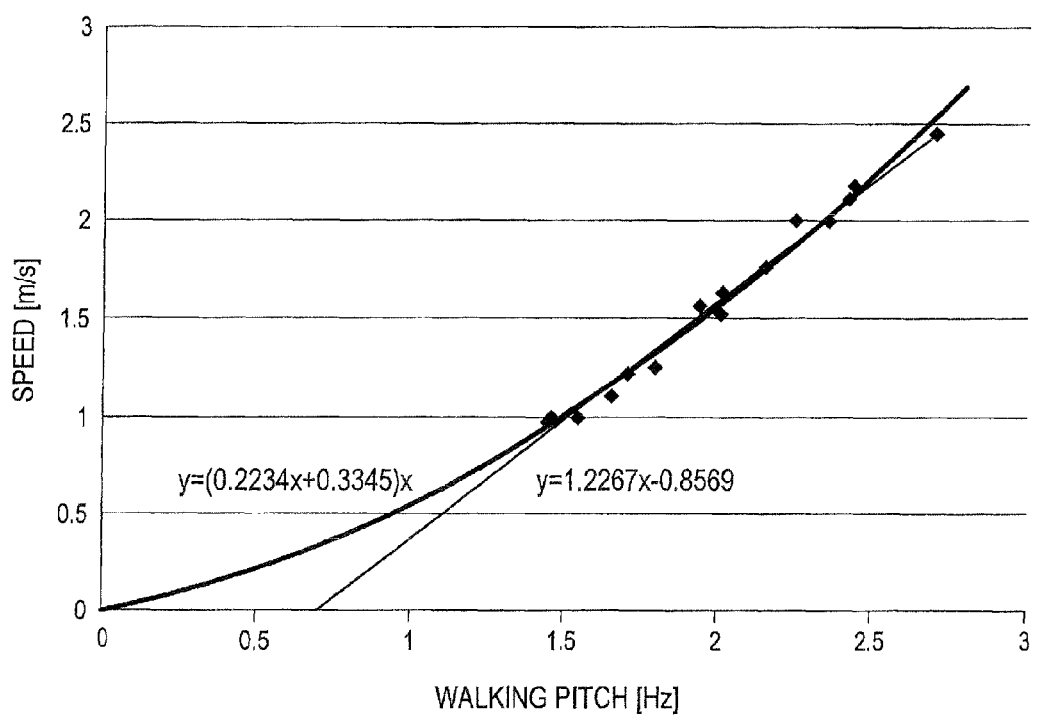
FIG. 13 is a graph showing an example of an approximate curve generated by the portable terminal according to the present embodiment.
Figure 14:
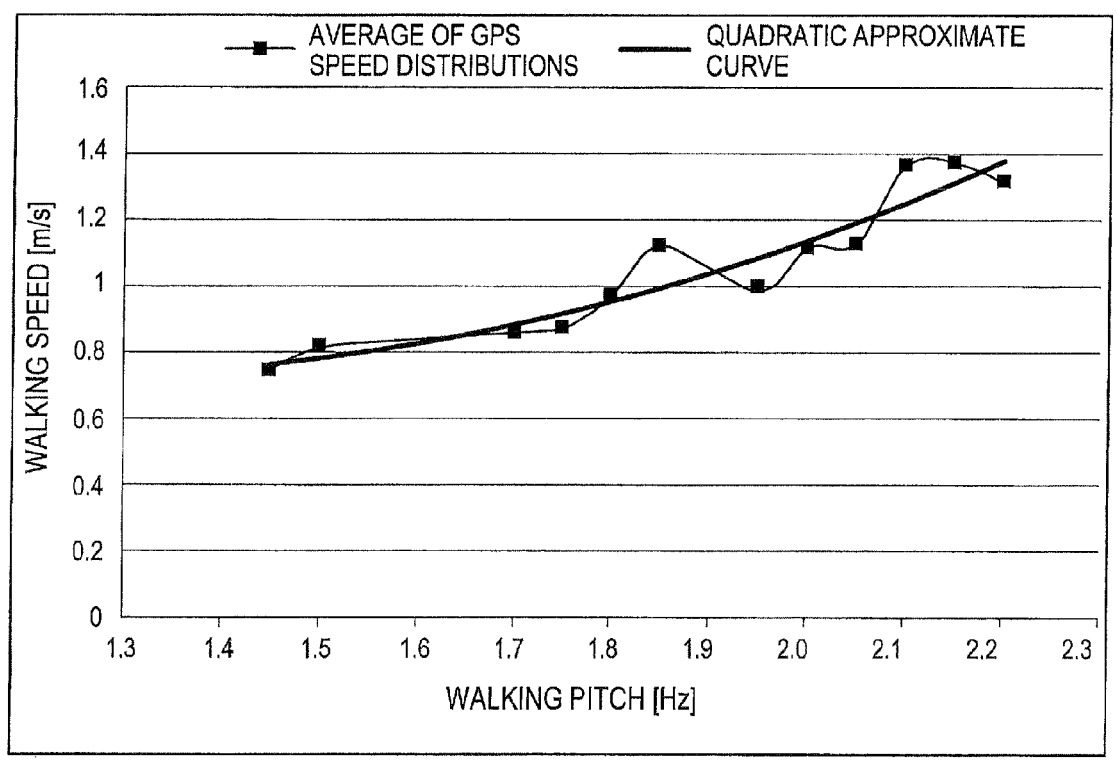
FIG. 14 is a graph showing another example of the approximate curve generated by the portable terminal according to the present embodiment.
Figure 15:
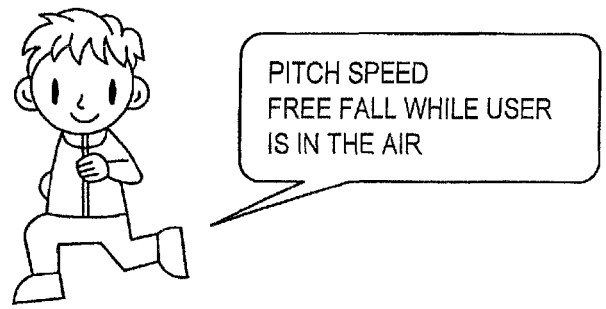
FIG. 15 is a drawing explaining various traveling modes determined by the portable terminal according to the present embodiment.
Figure 15:
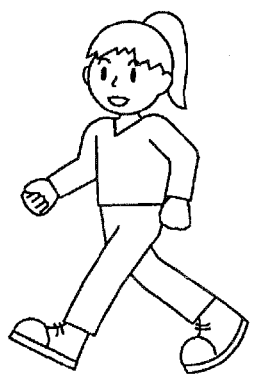
Figure 15:
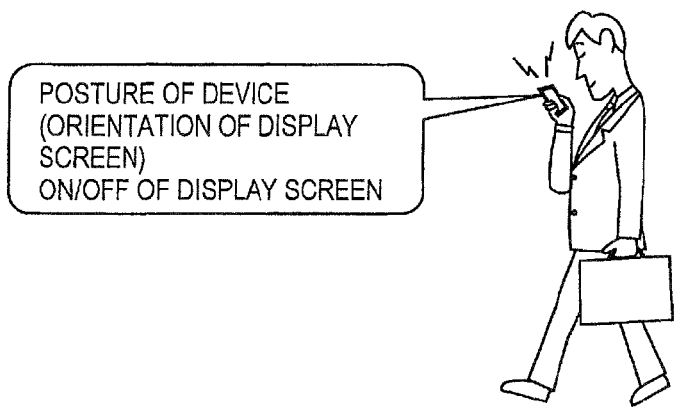
Figure 16:
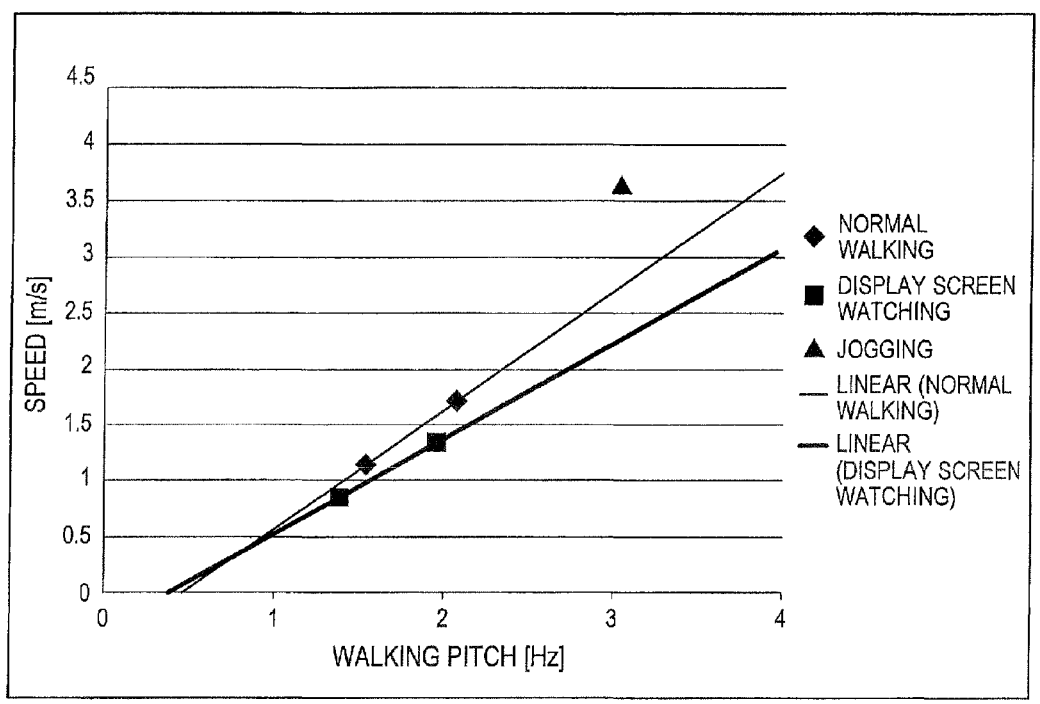
FIG. 16 is a drawing showing an example of measurement result of the traveling pitch and the speed for each traveling mode determined by the portable terminal according to the present embodiment.

Referring to FIG. 12 to FIG. 16, description will be provided on the functional configuration of the portable terminal 10b according to the second embodiment of the present disclosure. FIG. 12 is a block diagram showing the functional configuration of the portable terminal according to the second embodiment of the present disclosure. FIG. 13 is a graph showing an example of an approximate curve generated by the portable terminal according to the present embodiment. FIG. 14 is a graph showing another example of the approximate curve generated by the portable terminal according to the present embodiment. FIG. 15 is a drawing explaining various traveling modes determined by the portable terminal according to the present embodiment. FIG. 16 is a drawing showing an example of measurement result of the traveling pitch and the speed for each traveling mode determined by the portable terminal according to the present embodiment.

The portable terminal 10b according to the second embodiment includes the GPS information acquiring section 105, the traveling pitch acquiring section 110, a traveling-pitch to speed table generating section 115b, a speed estimating section 120b, the application operating section 125, a mode determining section 130, and a traveling-pitch to speed table 50b.

The portable terminal 10b according to the second embodiment is different from the portable terminal 10a according to the first embodiment in the following features: the table is generated for each traveling mode, and a post processing is carried out after the table generation. Hence, the portable terminal 10b is different from the portable terminal 10a in the operations of the traveling-pitch to speed table generating section 115 and the speed estimating section 120, and the portable terminal 10b further includes a function of the mode determining section 130. Hereinafter, description will be provided mainly on the different features from those of the first embodiment, and description on the common features will be omitted.

(Traveling-Pitch to Speed Table Generating Section 115b)

The traveling-pitch to speed table generating section 115b further has a function of carrying out the post-processing on data of the traveling-pitch to speed table 50b in addition to the functions of the above described traveling-pitch to speed table generating section 115a. This post-processing may include a smoothing processing using an approximate curve, for example. The following formulas (1) and (2) may be used as the approximate equations.

$$\text{Linear equation: vel} = a*\text{pitch} + b (a>0, b<0) \quad \text{Formula (1)}$$

$$\text{Quadratic equation: vel} = a*\text{pitch}^2 + b*\text{pitch}(a>0, b>0) \quad \text{Formula (2)}$$

FIG. 13 shows respective approximate curves approximated by the linear equation and the quadratic equation, for example. If the linear equation is used, the approximate equation is y=1.2267x−0.8569 (the first order term is a positive value, and the constant term is a negative value), for example. If the quadratic equation is used, the approximate equation is y=(0.2234x+0.3345)x, for example.

For example, the graph shown in FIG. 8 is approximated by using the above formula (2), the approximate curve shown in FIG. 14 is obtained. It is expected that influence due to an abnormal value can be reduced by using the approximate equation, for example, thereby further enhancing the accuracy of the traveling-pitch to speed table. A speed for a walking pitch that is not learned yet can be tentatively found by using the approximate equation. If the approximate equation is used in this manner, the distance from the approximate curve may be used as the index of precision for each speed.

The traveling-pitch to speed table generating section 115b can generate the traveling-pitch to speed table for each traveling mode that is determined on the mode determining section 130. For example, the traveling mode used in this example may include the jogging mode, the normal waking mode and the display screen watching mode, as shown in FIG. 15. It may be estimated that, if the user is jogging, the traveling distance for one step is greater, and the speed for the same traveling pitch is faster than in the normal walking mode. It may also be estimated that, if the user is watching the display screen, the traveling distance for one step is smaller, and the speed for the same traveling pitch is slower than in the normal walking mode or in the jogging mode.

FIG. 16 shows a result of a proving test on the difference in the correspondence between the walking pitch and the speed depending on the traveling mode. It has been confirmed that there is a difference in the correspondence between the walking pitch and the speed depending on the traveling mode.
(Mode Determining Section 130)

The mode determining section 130 has a function of determining the traveling mode of the user. The mode determining section 130 can determine whether or not the traveling mode is a jogging mode in which the user is running by use of output from the acceleration sensor, for example. For example, the mode determining section 130 can determine whether or not the traveling mode is the jogging mode based on the determination whether or not the output of the acceleration sensor includes a great magnitude in the vertical direction and a fast pitch, and free fall is detected while the user is floating in the air (only gravitational acceleration is detected at this time).

The mode determining section 130 can determine whether or not the traveling mode is the display screen watching mode in which the user is walking while watching the display screen of the portable terminal 10b. At this time, the mode determining section 130 can determine the orientation of the display screen by estimating a posture of the device based on the direction of the gravitational acceleration, for example, so as to determine that the traveling mode is the display screen watching mode if the display screen faces upward, and the status of the display device (ON or OFF) is ON. The mode determining section 130 supplies the traveling-pitch to speed table generating section 115b and the speed estimating section 120b with the determined information regarding the traveling mode.
(Speed Estimating Section 120b)

The speed estimating section 120b further has a function of estimating the speed based on the traveling mode in addition to the functions of the speed estimating section 120a. The speed estimating section 120b has a function of estimating the speed of the user with reference to the table corresponding to the traveling mode among the traveling-pitch to speed table 50b based on the information regarding the traveling mode supplied from the mode determining section 130.

As described above, an example of the function of the portable terminal 10b according to the present embodiment has been explained. The above described structural elements may be configured by using multi-purpose members or circuits, or may be configured by using hardware dedicated to each function of the structural elements. Each function of the structural elements may be executed in such a manner that an arithmetic unit such as a CPU (central processing section) reads a control program from a storage medium such as a ROM (read only memory) or a RAM (random access memory) that stores control programs describing processing procedures to realize various functions of the structural elements, and the arithmetic unit interprets and executes this program. Accordingly, it is possible to appropriately change the configuration of the structural elements to be used in accordance with the technical level at the time of implementing the present embodiment.

It is possible to generate computer programs to embody the above described various functions of the portable terminal 10b according to the present embodiment, and implement the programs in a personal computer and others. It is also possible to provide a computer readable storage medium that stores the above described computer programs. An example of such a storage medium is a magnetic disk, an optical disk, a magneto-optical disk, or a flash memory, etc. The above described computer programs may be distributed via a network, for example, without using the storage medium.

[3-2. Example of Operation]

Figure 17:
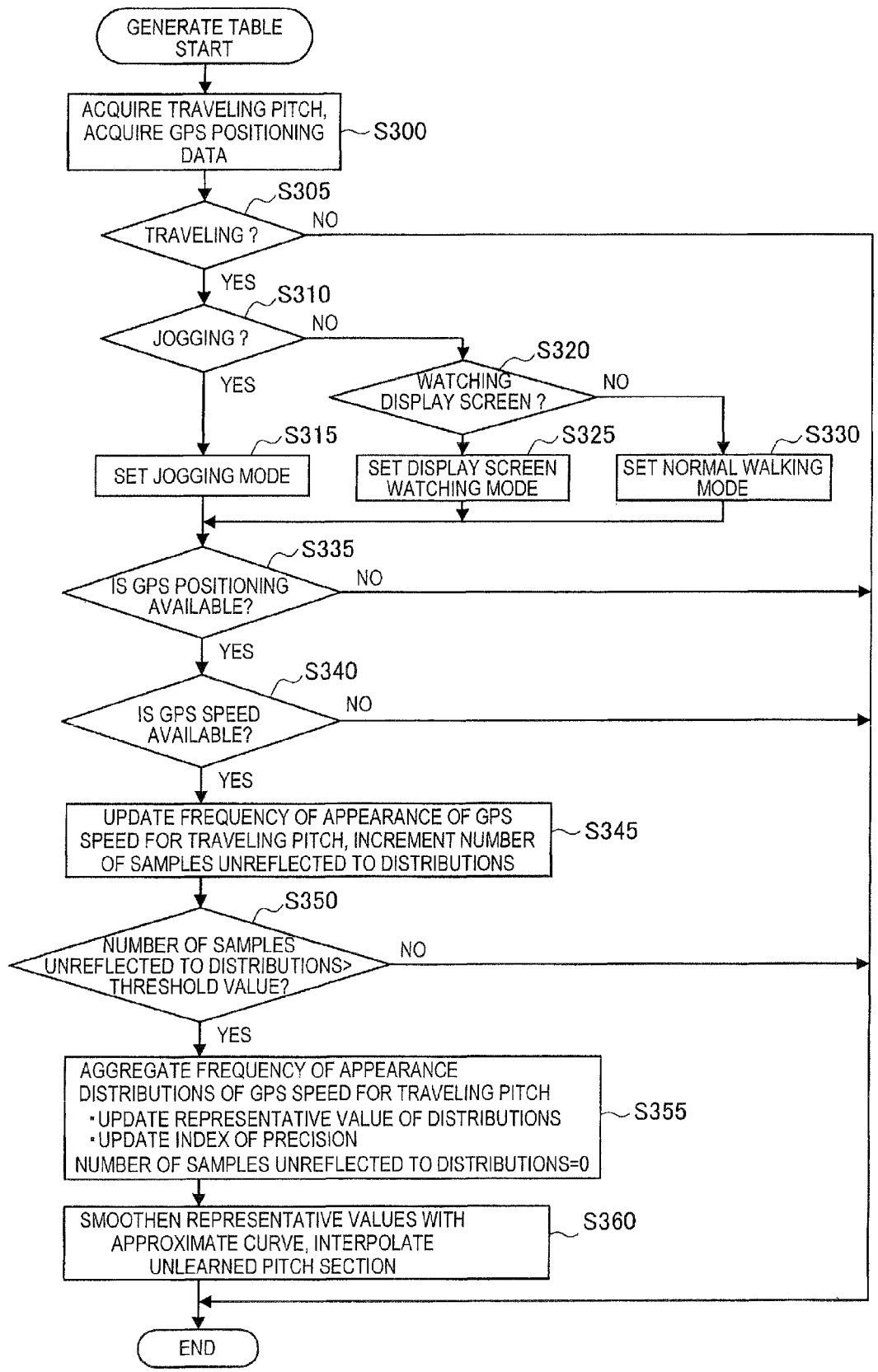
FIG. 17 is a flow chart showing a table generating operation of the portable terminal according to the present embodiment.
Figure 18:
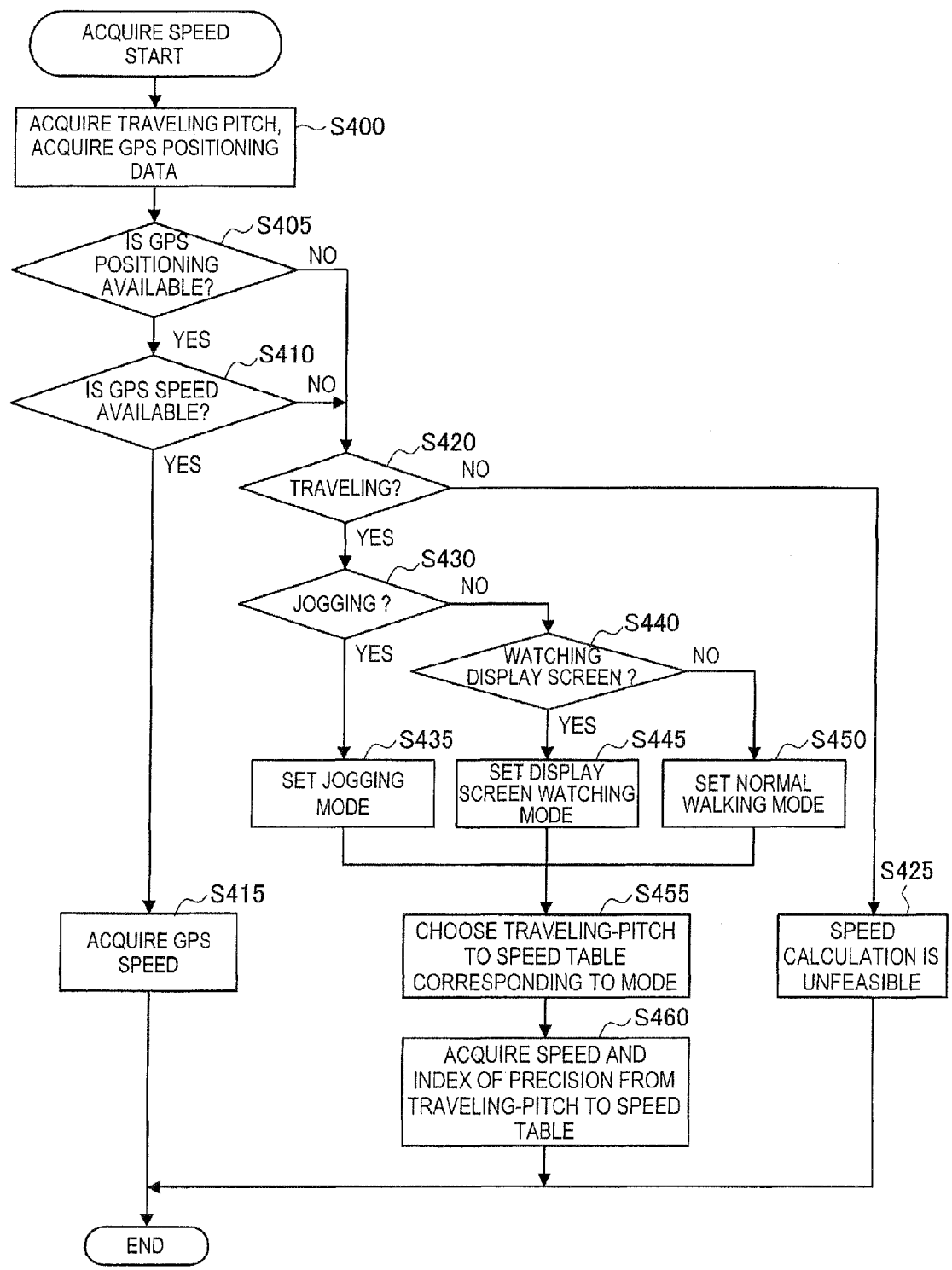
FIG. 18 is a flow chart showing a speed acquiring operation of the portable terminal according to the present embodiment.

Referring to FIG. 17 and FIG. 18, description will be provided on the example of the operation of the portable terminal 10b according to the second embodiment of the present disclosure. FIG. 17 is a flow chart showing the table generating operation of the portable terminal according to the present embodiment. FIG. 18 is a flow chart showing the speed acquiring operation of the portable terminal according to the present embodiment.
(Table Generating Operation)

Referring to FIG. 17, the table generating operation of the portable terminal 10b is shown. The portable terminal 10b acquires the current traveling pitch by the traveling pitch acquiring section 110, and acquires the GPS positioning data by the GPS information acquiring section 105 (S300). The traveling-pitch to speed table generating section 115b then determines whether or not the user is traveling (S305).

If it is determined that the user is traveling in the determination in step S305, the traveling-pitch to speed table generating section 115b determines whether or not the user is jogging based on the result of the determination on the mode determining section 130 (S310). If it is determined that the user is jogging in the determination in step S310, the traveling-pitch to speed table generating section 115b sets the traveling mode to be the jogging mode (S315). At this time, subsequent processing is executed on data regarding the jogging mode.

In the determination in step S310, if it is determined that the user is not jogging, the traveling-pitch to speed table generating section 115b determines whether or not the traveling mode is the display screen watching mode based on the result of the determination on the mode determining section 130 (S320). If it is determined that the mode is the display screen watching mode, the traveling-pitch to speed table generating section 115b sets the mode to be the display screen watching mode (S325). At this time, subsequent processing is executed on data regarding the display screen watching mode. To the contrary, if it is determined that the mode is not the display screen watching mode in the determination in step S320, the traveling-pitch to speed table generating section 115b sets the mode to be the normal walking mode (S330). At this time, subsequent processing is executed on data regarding the normal walking mode.

The traveling-pitch to speed table generating section 115b determines whether or not the GPS positioning is available at the current position (S335). If it is determined that the GPS positioning is available, the traveling-pitch to speed table generating section 115b determines whether or not the GPS speed is available (S340).

If it is determined that the GPS speed is available in the determination in step S340, the traveling-pitch to speed table generating section 115b updates the frequency of appearance of the GPS speed for the traveling pitch, and increments the number of the samples unreflected to the distributions (S345).

At this time, the traveling-pitch to speed table generating section 115b determines whether or not the number of the samples unreflected to the distributions is more than a threshold value (S350). If the number of the unreflected samples to the distributions is more than the threshold value, the traveling-pitch to speed table generating section 115b aggregates the frequency of appearance distributions of the GPS speed for each traveling pitch (S355). At this time, the representative value of the distributions and the index of precision are updated, and the number of the unreflected samples to the distributions is reset to be zero. The traveling-pitch to speed table generating section 115b smoothens the representative values with the approximate curve (S360). Accordingly, the traveling-pitch to speed table generating section 115b can interpolate data regarding unlearned pitches.

(Speed Acquiring Processing)

Description will be provided on the speed acquiring processing by the speed estimating section 120b with reference to FIG. 18. The speed estimating section 120b acquires the traveling pitch from the traveling pitch acquiring section 110, and acquires the GPS positioning data from the GPS information acquiring section 105 (S400).

Herein, the speed estimating section 120b determines whether or not the GPS positioning is available (S405). If it is determined that the GPS positioning is available, the speed estimating section 120b then determines whether or not the GPS speed is available (S410). If it is determined that the GPS speed is available, the speed estimating section 120b acquires the GPS speed, and sets this GPS speed as the traveling speed of the user (S415).

On the other hand, if it is determined that the GPS positioning is unavailable in the determination in step S405, and if it is determined that the GPS speed is unavailable in the determination in step S410, the speed estimating section 120b determines whether or not the user is traveling (S420). If it is determined that the user is not traveling in the determination in step S420, the speed estimating section 120b determines that the calculation of the speed is unfeasible (S425).

On the other hand, if it is determined that the user is traveling in the determination in step S420, the speed estimating section 120b then determines whether or not the user is jogging based on the result of the determination on the mode determining section 130 (S430). If it is determined that the user is jogging in the determination in step S430, the speed estimating section 120b sets the mode to be the jogging mode (S435). On the other hand, if it is determined that the user is not jogging in the determination in step S430, the speed estimating section 120b determines whether or not the user is watching the display screen based on the result of the determination on the mode determining section 130 (S440). If it is determined that the user is watching the display screen in the determination in step S440, the speed estimating section 120b sets the mode to be the display screen watching mode (S445). To the contrary, if it is determined that the user is not watching the display screen in the determination in step S440, the speed estimating section 120b sets the mode to be the normal walking mode (S450).

After the mode setting is carried out in this manner, the speed estimating section 120b chooses the traveling-pitch to speed table corresponding to the mode (S455). The speed estimating section 120b then acquires the speed and the index of precision based on the traveling pitch from the traveling-pitch to speed table (S460).

As described above, the table is generated for each traveling mode, thereby enhancing the accuracy of the speed estimation. Accordingly, such an effect can be achieved that enhances accuracy of information calculated by using the above estimated speed, such as accuracy of the positional information.

<4. Third Embodiment>

[4-1. Example of Functional Configuration]

Figure 19:
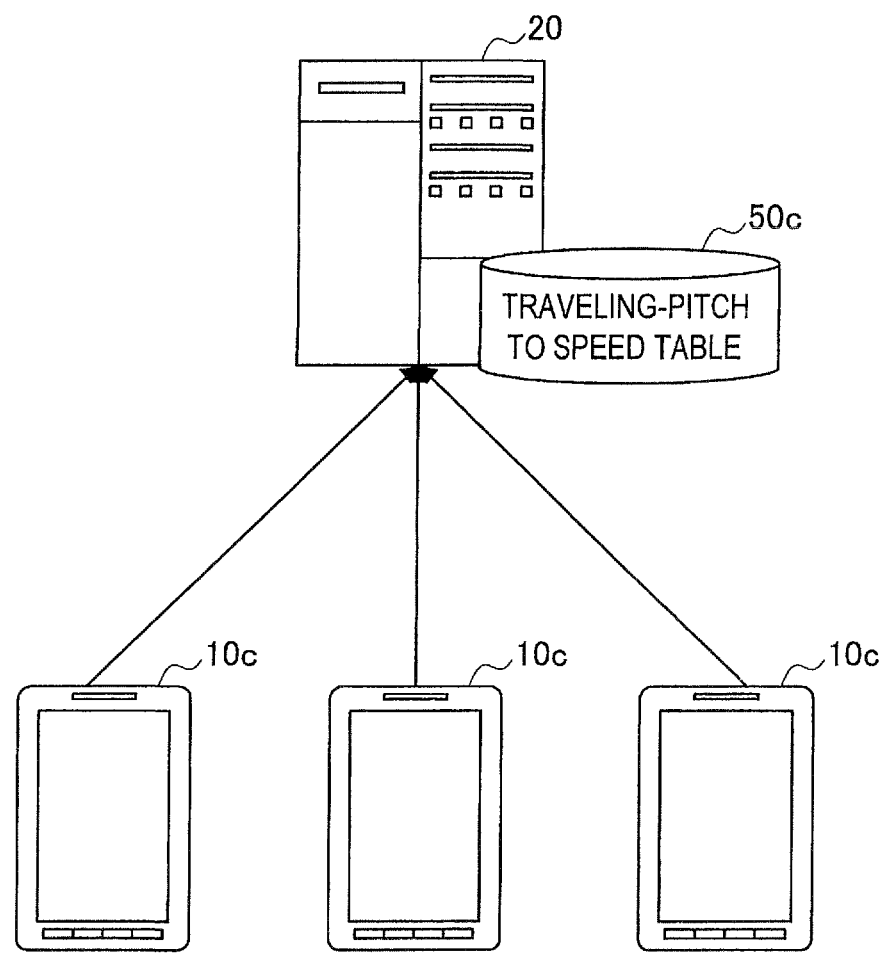
FIG. 19 is an explanatory drawing showing a configuration of a speed estimating system according to the third embodiment of the present disclosure.
Figure 20:
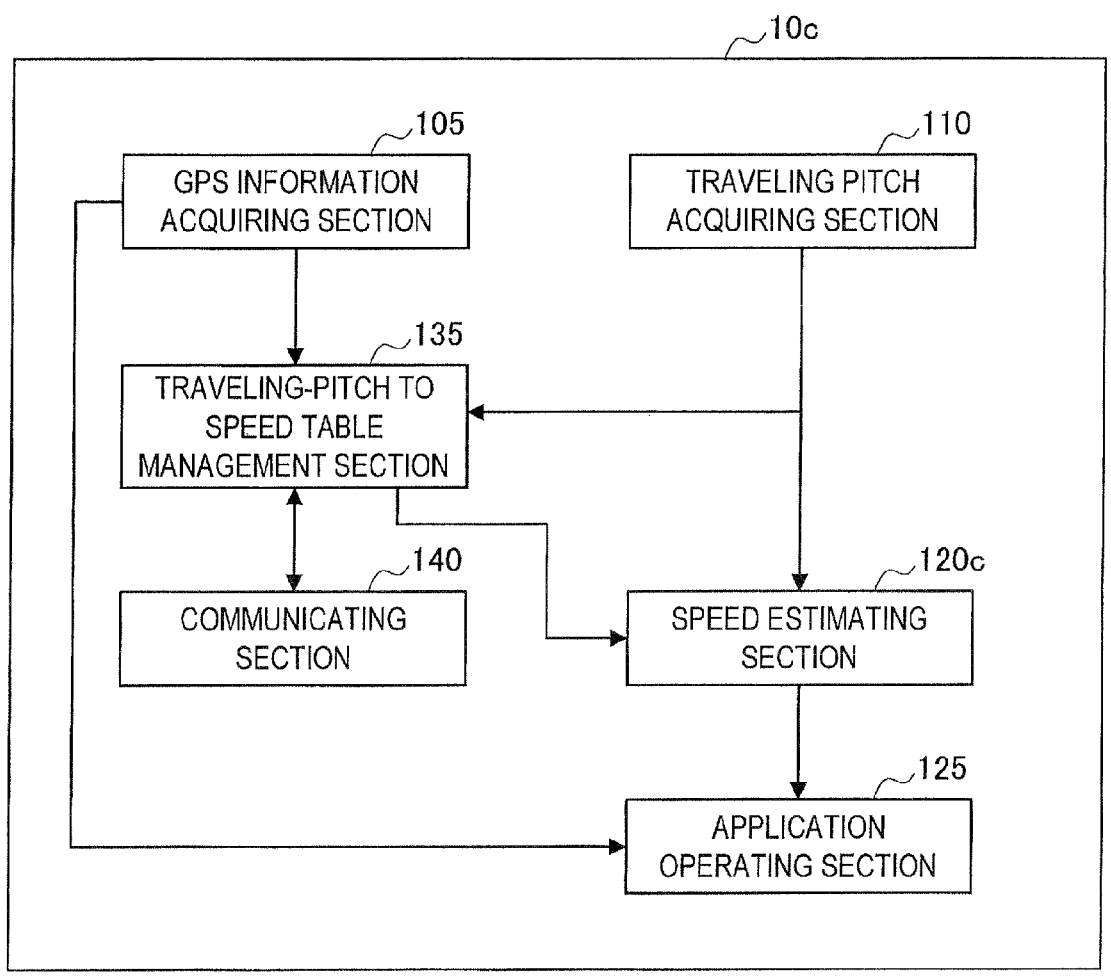
FIG. 20 is a block diagram showing a functional configuration of the portable terminal according to the present embodiment.
Figure 21:
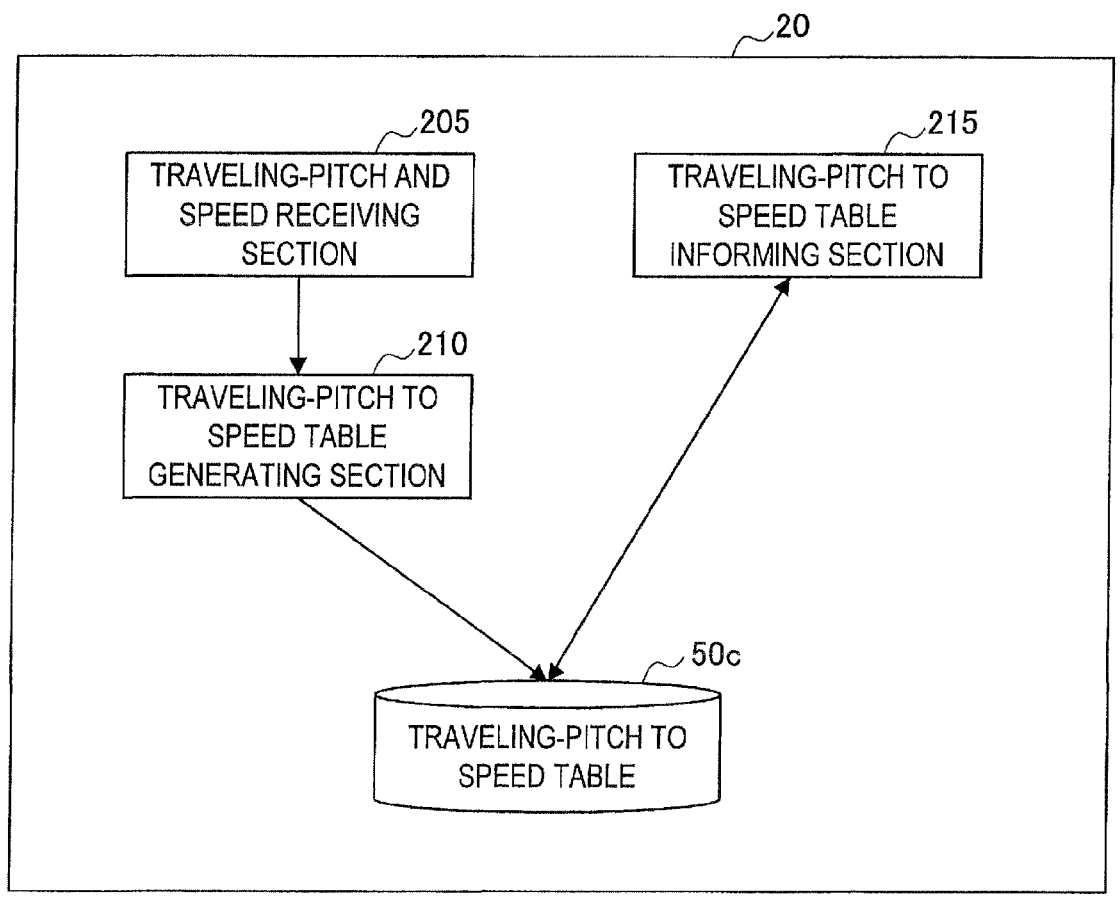
FIG. 21 is a block diagram showing a functional configuration of a server device according to the present embodiment.

Referring to FIG. 19 to FIG. 21, description will now be provided on the functional configuration according to the third embodiment in which the traveling-pitch to speed table is stored on a server. FIG. 19 is an explanatory drawing showing the configuration of a speed estimating system according to the third embodiment of the present disclosure. FIG. 20 is a block diagram showing the functional configuration of the portable terminal according to the present embodiment. FIG. 21 is a block diagram showing the functional configuration of the server device according to the present embodiment.

(System Configuration)

Referring to FIG. 19, the speed estimating system according to the present embodiment includes plural portable terminals 10c, the server device 20 including the traveling-pitch to speed table 50c.

In the present embodiment, the traveling-pitch to speed table 50c is generated and updated by the plural portable terminals 10c. The portable terminals 10c can use the traveling-pitch to speed table included in the server device 20.

(Portable Terminals 10c)

Referring to FIG. 20, description will now be provided on the functional configuration of the portable terminal 10c.

The portable terminal 10c mainly includes the GPS information acquiring section 105, the traveling pitch acquiring section 110, the speed estimating section 120c, the application operating section 125, a traveling-pitch to speed table management section 135, and a communicating section 140. Description will be provided mainly on different features from those of the portable terminal 10a and the portable terminal 10b, and description on similar functions thereof will be omitted.

(Speed Estimating Section 120c)

The speed estimating section 120c has a function of estimating the speed by use of the traveling-pitch to speed table supplied from the traveling-pitch to speed table management section 135. The other functions of the speed estimating section 120c are the same as those of the speed estimating section 120a or the speed estimating section 120b and description thereof will be omitted.

(Traveling-Pitch to Speed Table Management Section 135)

The traveling-pitch to speed table management section 135 has a function of managing the traveling-pitch to speed table. For example, the traveling-pitch to speed table management section 135 can update the traveling-pitch to speed table 50c on the server device 20 using the GPS speed acquired by the GPS information acquiring section 105, and the traveling pitch acquired by the traveling pitch acquiring section 110. The traveling-pitch to speed table management section 135 may download the traveling-pitch to speed table into a storage section in the portable terminal 10c, if necessary.

(Communicating Section 140)

The communicating section 140 is a connecting interface for making a connection to external devices such as the server device 20c, for example. The communicating section 140 can send the traveling pitch and the GPS speed to the server device 20c in accordance with control by the traveling-pitch to speed table management section 135.

(Server Device 20)

Referring to FIG. 21, the functional configuration of the server device 20 according to the present embodiment will now be described. The server device 20 mainly includes a traveling-pitch and speed receiving section 205, a traveling-pitch to speed table generating section 210, a traveling-pitch to speed table informing section 215, and the traveling-pitch to speed table 50c.

(Traveling-Pitch and Speed Receiving Section 205)

The traveling-pitch and speed receiving section 205 has a communicating function of receiving the traveling pitch and the speed from the plural portable terminals 10c. The traveling-pitch and speed receiving section 205 can supply the traveling-pitch to speed table generating section 210 with the received traveling pitch and speed.

(Traveling-Pitch to Speed Table Generating Section 210)

The traveling-pitch to speed table generating section 210 has a function of generating the traveling-pitch to speed table for plural users in addition to the function of the traveling-pitch to speed table generating section 115. The traveling-pitch to speed table generating section 210 may generate the traveling-pitch to speed table for each user. The traveling-pitch to speed table generating section 210 may also aggregate data regarding the plural users, so as to generate a traveling-pitch to speed table for a virtual average user. At this time, the traveling-pitch to speed table generating section 210 may aggregate data regarding users belonging to each local area in total. For example, it is estimated that a village area has a different average trend in the correspondence between the traveling pitch and the speed from that in a building district in downtown. Accordingly, the aggregation of data for each local area enhances accuracy of the information.

The traveling-pitch to speed table generating section 210 may extract a group of users having a particular speed value for a particular traveling pitch, so as to acquire expected values of speeds for other traveling pitches. The traveling-pitch to speed table for a plurality of users, the traveling-pitch to speed table aggregated for each local area and the traveling-pitch to speed table aggregated for those users having the same trend are effective for acquiring speeds and indexes of precision for unlearned traveling pitches even though accuracy of their information becomes lower than information strictly aggregated for each user. For example, such information may be used as a default speed for the portable terminal if this portable terminal has no learned data.

(Traveling-Pitch to Speed Table Informing Section 215)

The traveling-pitch to speed table informing section 215 has a function of informing the portable terminal 10c of the traveling-pitch to speed table, or of a speed extracted from the traveling-pitch to speed table in accordance with a request from the portable terminal 10c.

As described above, an example of the functions of the portable terminal 10c and the server device 20 according to the present embodiment has been explained. The above described structural elements may be configured by using multi-purpose members or circuits, or may be configured by using hardware dedicated to each function of the structural elements. Each function of the structural elements may be executed in such a manner that an arithmetic unit such as a CPU (central processing section) reads a control program from a storage medium such as a ROM (read only memory) or a RAM (random access memory) that stores control programs describing processing procedures to realize various functions of the structural elements, and the arithmetic unit interprets and executes this program. Accordingly, it is possible to appropriately change the configuration of the structural elements to be used in accordance with the technical level at the time of implementing the present embodiment.

It is possible to generate computer programs to embody the above described various functions of the portable terminal 10c and the server device 20 according to the present embodiment, and implement the programs in a personal computer and others. It is also possible to provide a computer readable storage medium that stores the above described computer programs. An example of such a storage medium is a magnetic disk, an optical disk, a magneto-optical disk, or a flash memory, etc. The above described computer programs may be distributed via a network, for example, without using the storage medium.

[4-2. Example of Operation]

Figure 22:
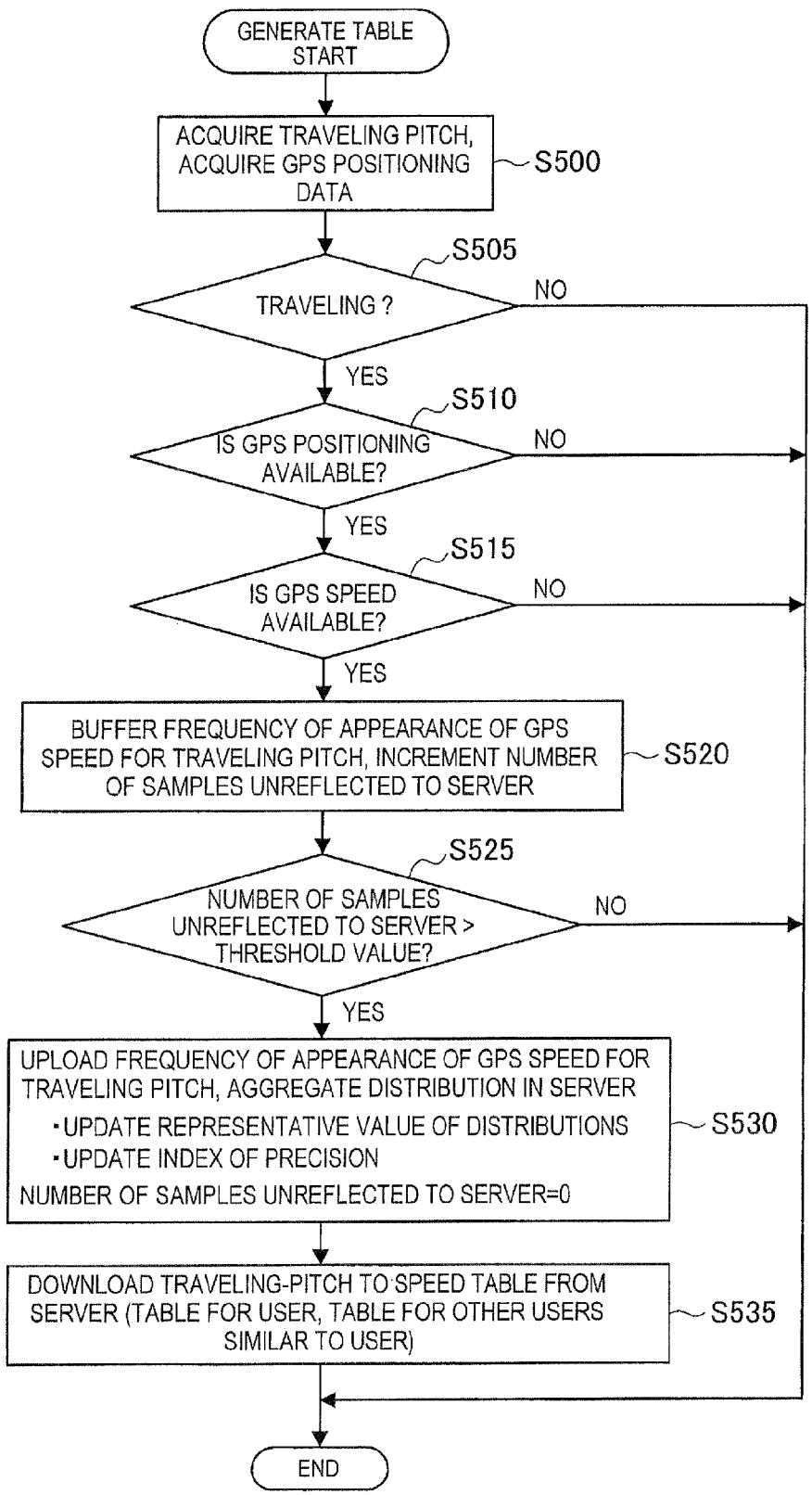
FIG. 22 is a flow chart showing a table generating processing of the portable terminal and the server device according to the present embodiment.
Figure 23:
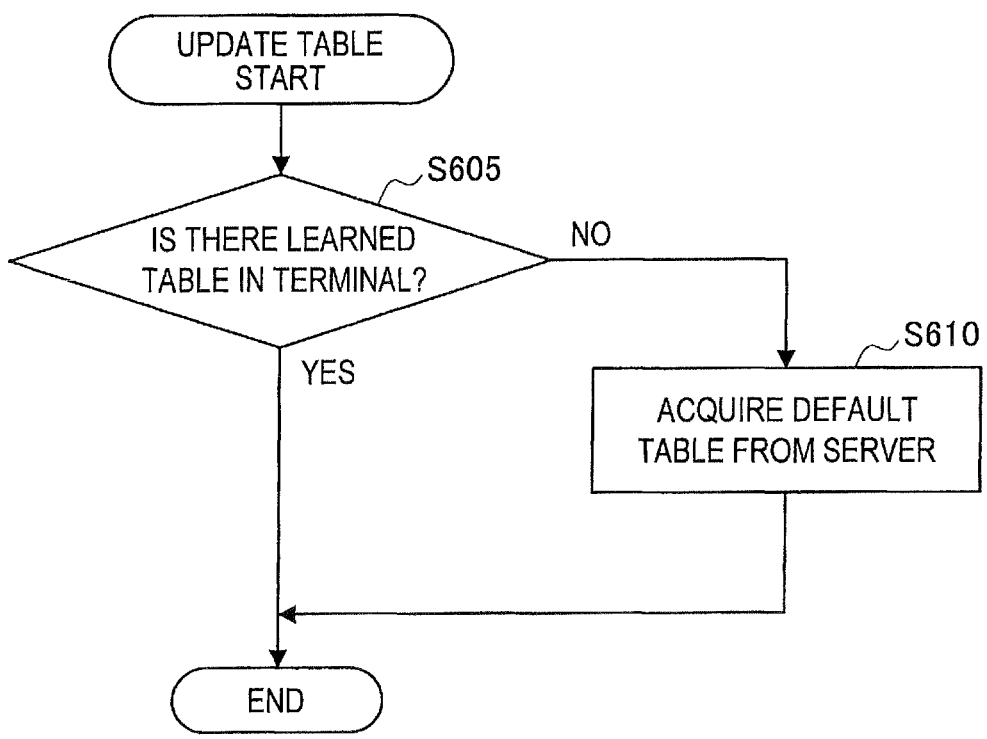
FIG. 23 is a flow chart showing a table updating operation of the portable terminal according to the present embodiment.
Figure 24:
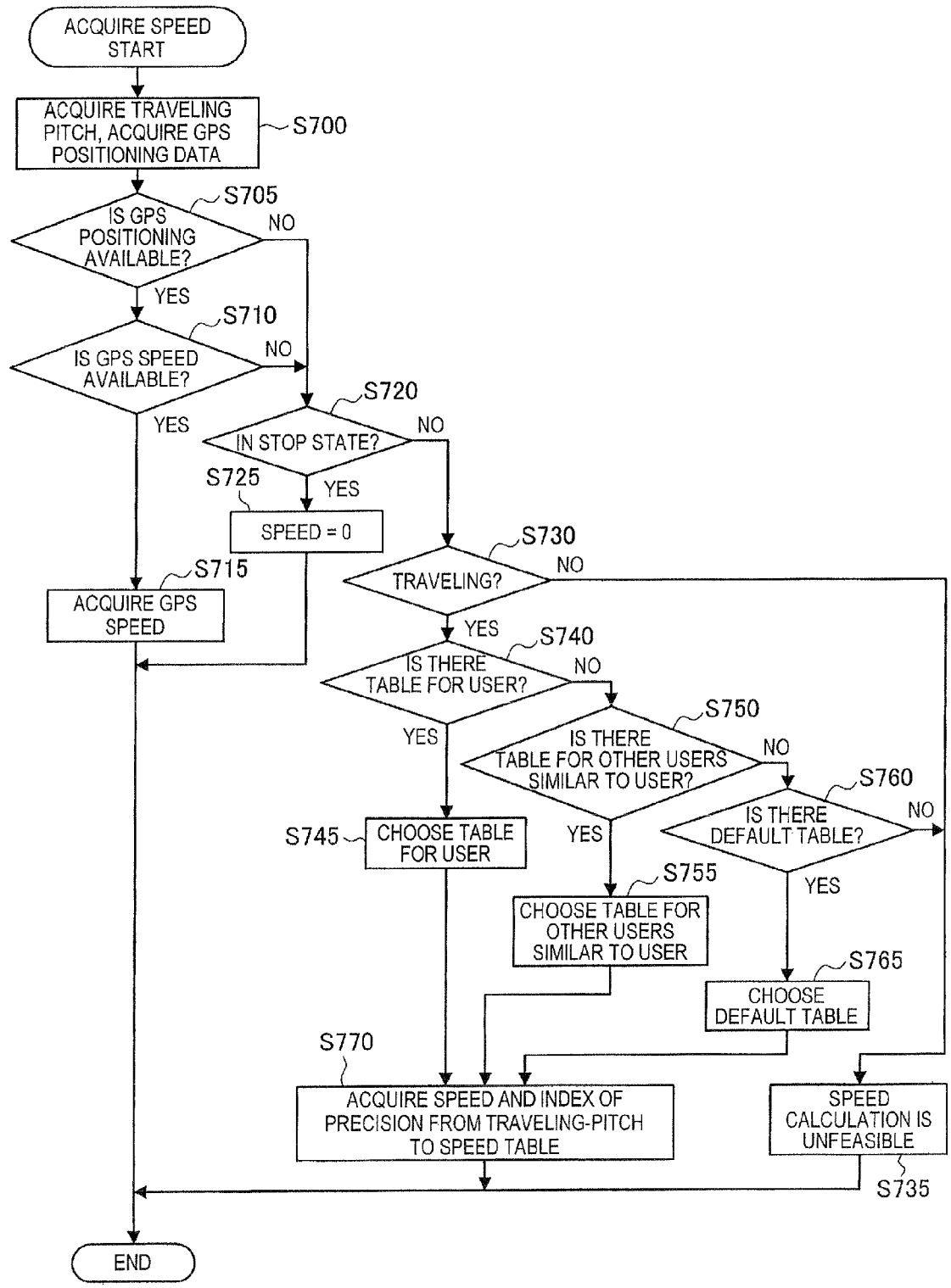
FIG. 24 is a flow chart showing a speed acquiring processing of the portable terminal according to the present embodiment.

Referring to FIG. 22 and FIG. 24, description will be provided on the example of the operations of the portable terminal 10c and the server device 20 according to the third embodiment of the present disclosure. FIG. 22 is a flow chart showing the table generating processing of the portable terminal and the server device according to the present embodiment. FIG. 23 is a flow chart showing the table updating processing of the portable terminal according to the present embodiment. FIG. 24 is a flow chart showing the speed acquiring processing of the portable terminal according to the present embodiment.

(Table Generating Processing)

Referring to FIG. 22, the portable terminal 10c acquires the current traveling pitch by the traveling pitch acquiring section 110, and acquires the GPS positioning data by the GPS information acquiring section 105 (S500). The traveling-pitch to speed table management section 135 determines whether or not the user is traveling (S505). The traveling-pitch to speed table management section 135 determines whether or not the GPS positioning is available at the current position (S510). The traveling-pitch to speed table management section 135 then determines whether or not the GPS speed is available (S515).

If it is determined that the user is traveling, the GPS positioning is available, and the GPS speed is available in the determinations in steps S505, S510, and S515, the traveling-pitch to speed table management section 135 buffers the frequency of appearance of the GPS speed for the traveling pitch. The traveling-pitch to speed table management section 135 then increments the number of the samples unreflected to the server device 20 (S520).

The traveling-pitch to speed table management section 135 determines whether or not the number of the samples unreflected to the server device 20 becomes more than the threshold value (S525). If the number of the samples unreflected to the server device 20 becomes more than the threshold value, the traveling-pitch to speed table management section 135 uploads to the server device 20 the frequency of appearance of the GPS speed sufficient for the traveling pitches (S530). The aggregating processing on the distributions is then carried out in the server device 20. At this time, the representative values of the distributions and the indexes of precision are updated, and the number of the samples unreflected to the server device 20 is reset to be zero.

Through the above steps, the portable terminal 10c can download the updated traveling-pitch to speed table from the server device 20 (S535). At this time, the portable terminal 10c can also download a table for the user, or a table for other users having a similar trend to the user.

(Table Updating Processing)

Referring to FIG. 23, the table updating processing will be described. The traveling-pitch to speed table management section 135 of the portable terminal 10c determines whether or not there is any table that is already learned in the portable terminal 10c (S605), for example. If it is determined that there is no learned table in the portable terminal in the determination in step S605, the traveling-pitch to speed table management section 135 can acquire a default table from the server device 20 (S610).

(Speed Acquiring Processing)

Referring to FIG. 24, the speed acquiring processing will be described. The speed estimating section 120c of the portable terminal 10c acquires the traveling pitch from the traveling pitch acquiring section 110, and acquires the GPS positioning data from the GPS information acquiring section 105 (S700). The speed estimating section 120c determines whether or not the GPS positioning is available (S705). If it is determined that the GPS positioning is available, the speed estimating section 120c then determines whether or not the GPS speed is available (S710). If it is determined that the GPS speed is available, the speed estimating section 120c acquires the GPS speed, and defines this GPS speed as the traveling speed for the user (S715).

On the other hand, if it is determined that the GPS positioning is unavailable in step S705, or if it is determined that the GPS speed is unavailable in step S710, the speed estimating section 120c determines whether or not the user is in a stop state (S720). The determination in step S720 may be performed based on the swing detecting data acquired from the acceleration sensor, or the like, for example. At this time, if it is determined that the user is in the stop state, the speed estimating section 120c sets the speed of the user to be zero (S725). On the other hand, if it is determined that the user is out of the stop state in S720, the speed estimating section 120c then determines whether or not the user is traveling (S730). At this time, if it is determined that the user is not traveling, the speed estimating section 120c determines that the calculation of the speed is unfeasible (S735).

To the contrary, if it is determined that the user is traveling in step S730, the speed estimating section 120c can request the traveling-pitch to speed table management section 135 to supply an appropriate table. The traveling-pitch to speed table management section 135 determines whether or not there is a table for the user (S740). At this time, the traveling-pitch to speed table management section 135 can determine whether or not the table for the user exists in the portable terminal 10c or the server device 20. In the determination in step S740, if it is determined that the table for the user exists, the traveling-pitch to speed table management section 135 chooses the table for the user, and supplies this table for the speed estimating section 120c (S745). To the contrary, if it is determined that no table for the user exists in the determination in step S740, the traveling-pitch to speed table management section 135 determines whether or not there is any table for other users similar to the user (S750).

In the determination in step S750, if it is determined that there is any table for other users similar to the user, the traveling-pitch to speed table management section 135 can choose the table for other users similar to the user, and supplies this table for the speed estimating section 120c (S755). In the determination in step S750, if it is determined that there is no table for other users similar to the user, the traveling-pitch to speed table management section 135 then can determine whether or not there is any default table (S760). If it is determined that there is any default table in the determination in step S760, the traveling-pitch to speed table management section 135 can choose the default table (S765).

When the table for the user, the table for other users similar to the user, or the default table is chosen, and this chosen table is supplied for the speed estimating section 120c, the speed estimating section 120c extracts and acquires the speed and the index of precision for the current traveling pitch from the supplied table (S770).

<5. Example of HARDWARE CONFIGURATION>

[5-1. Example of Hardware Configuration of Portable Terminal]

Figure 25:
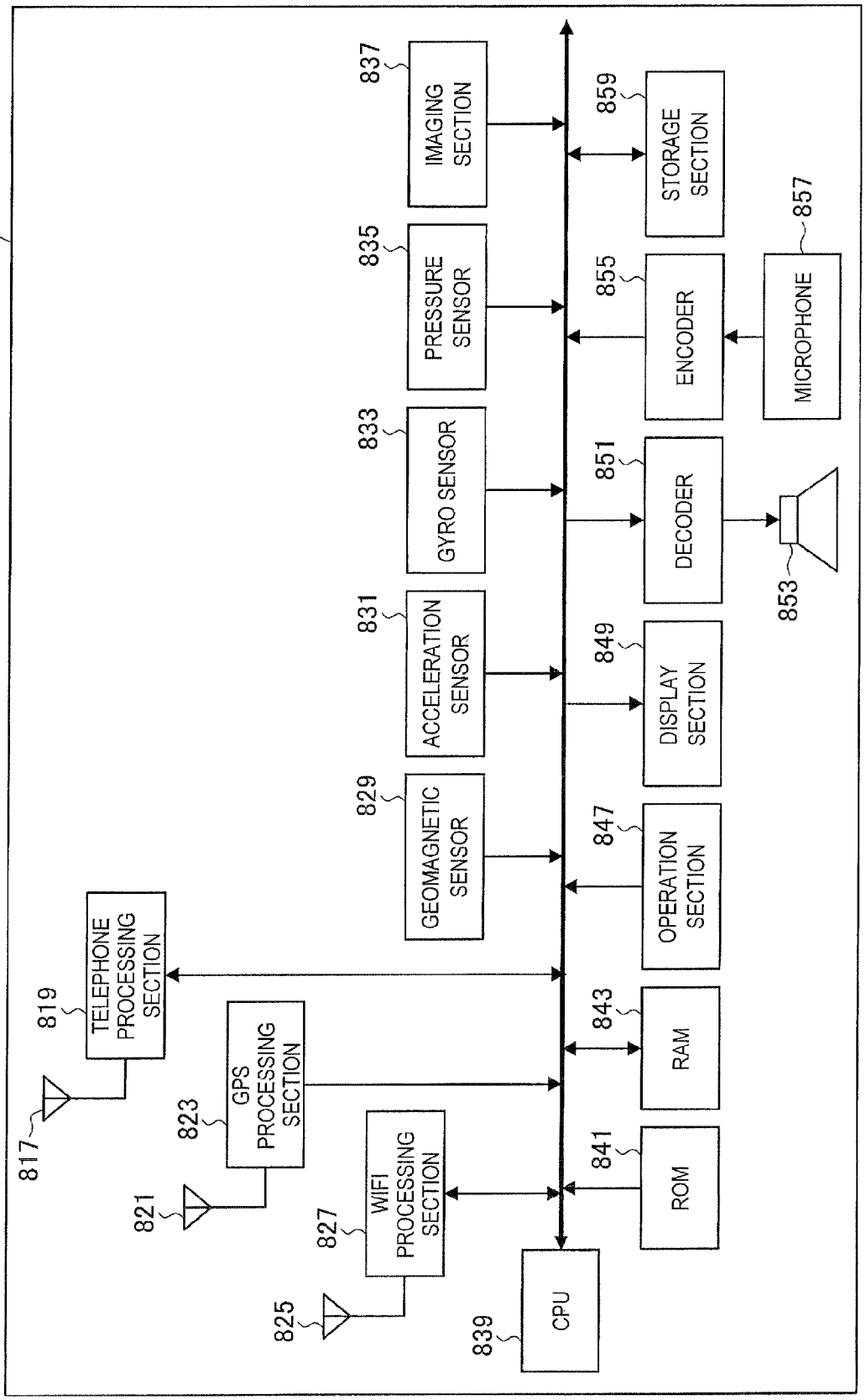
FIG. 25 is a block diagram showing a hardware configuration of the portable terminal according to the present embodiment.

Next, referring to FIG. 25, an example of a hardware configuration of the portable terminal 10 according to an embodiment of the present disclosure will be explained. FIG. 25 is a block diagram showing a hardware configuration of the portable terminal according to the embodiment.

First, an example of a configuration of a portable terminal 10 will be described. Referring to FIG. 9, the portable terminal 10 includes, for example, a telephone network antenna 817, a telephone processing section 819, a GPS antenna 821, a GPS processing section 823, a WiFi antenna 825, a WiFi processing section 827, a geomagnetic sensor 829, an acceleration sensor 831, a gyro sensor 833, a pressure sensor 835, an imaging section 837, a CPU (Central Processing Section) 839, a ROM (Read Only Memory) 841, a RAM (Random Access Memory) 843, an operation section 847, a display section 849, a decoder 851, a speaker 853, an encoder 855, a microphone 857, and a storage section 859. Note that the hardware configuration shown here is merely an example, and some of the structural elements may be omitted. Further, the hardware configuration may of course include structural elements other than the above-mentioned structural elements.

(Telephone Network Antenna 817)

The telephone network antenna 817 is an example of an antenna having a function of establishing a connection via radio waves with a mobile phone network for telephone call and data communication. The telephone network antenna 817 can supply the telephone processing section 819 with a telephone call signal received through the mobile phone network.

(Telephone Processing Section 819)

The telephone processing section 819 has a function of performing various types of signal processing on a signal transmitted/received by the telephone network antenna 817. For example, the telephone processing section 819 can perform various types of processing on an audio signal which is input through the microphone 857 and encoded by the encoder 855, and can supply the telephone network antenna 817 with the audio signal. Further, the telephone processing section 819 can perform various types of processing on an audio signal supplied by the telephone network antenna 817, and can supply the decoder 851 with the audio signal.

(GPS Antenna 821)

The GPS antenna 821 is an example of an antenna which receives a signal from a positioning satellite. The GPS antenna 821 is capable of receiving GPS signals from multiple GPS satellites, and inputs the received GPS signals to the GPS processing section 823.

(GPS Processing Section 823)

The GPS processing section 823 is an example of a calculation section which calculates positional information based on the signals received from the positioning satellites. The GPS processing section 823 calculates current positional information based on the multiple GPS signals input from the GPS antenna 821, and outputs the calculated positional information. To be specific, the GPS processing section 823 calculates positions of the respective GPS satellites based on the orbital data of the GPS satellites, and calculates distances from the respective GPS satellites to the portable terminal 10 based on the differences between transmission time and reception time of the GPS signals. Then, based on the calculated positions of the respective GPS satellites and the calculated distances from the respective GPS satellites to the portable terminal 10, a current three-dimensional position can be calculated. Note that the orbital data of GPS satellites used here may be included in the GPS signals, for example. Alternatively, the orbital data of GPS satellites may be acquired from an external server via the communication antenna 825.

(WiFi Antenna 825)

The WiFi antenna 825 is an antenna having a function of transmitting/receiving a communication signal to/from a wireless local area network (LAN) communication network in accordance with the WiFi specification, for example. The WiFi antenna 825 can supply the WiFi processing section 827 with the received signal.

(WiFi Processing Section 827)

The WiFi processing section 827 has a function of performing various types of signal processing on the signal supplied by the WiFi antenna 825. The WiFi processing section 827 can supply the CPU 839 with a digital signal generated from the supplied analog signal.

(Geomagnetic Sensor 829)

The geomagnetic sensor 829 is a sensor for detecting geomagnetism as a voltage value. The geomagnetic sensor 829 may be a 3-axis geomagnetic sensor which detects geomagnetism in the X-axis direction, the Y-axis direction, and the Z-axis direction. The geomagnetic sensor 829 can supply the CPU 839 with the detected geomagnetic data.

(Acceleration Sensor 831)

The acceleration sensor 831 is a sensor for detecting acceleration as a voltage value. The acceleration sensor 831 may be a 3-axis acceleration sensor which detects acceleration along the X-axis direction, acceleration along the Y-axis direction, and acceleration along the Z-axis direction. The acceleration sensor 831 can supply the CPU 839 with the detected acceleration data.

(Gyro Sensor 833)

The gyro sensor 833 is a measuring instrument for detecting an angle or an angular velocity of an object. The gyro sensor 833 may be a 3-axis gyro sensor which detects a variable velocity (angular velocity) of the rotation angle around each of the X-axis, the Y-axis, and the Z-axis as a voltage value. The gyro sensor 833 can supply the CPU 839 with the detected angular velocity data.

(Pressure Sensor 835)

The pressure sensor 835 is a sensor for detecting the surrounding pressure as a voltage value. The pressure sensor 835 detects a pressure at a predetermined sampling frequency, and can supply the CPU 839 with the detected pressure data.

(Imaging Section 837)

The imaging section 837 has a function of capturing a still image or a moving image via a lens in accordance with control of the CPU 839. The imaging section 837 may cause the storage section 859 to store the captured image.

(CPU 839)

The CPU 839 functions as an arithmetic processing section and a control section, and controls the overall operation inside the portable terminal 10 in accordance with various programs. Further, the CPU 839 may be a microprocessor. The CPU 839 can realize various functions in accordance with various programs.

(ROM 841, RAM 843)

The ROM 841 can store programs and arithmetic parameters used by the CPU 839. The RAM 843 can temporarily store programs used during execution of the CPU 839 and parameters that appropriately change during the execution thereof.

(Operation Section 847)

The operation section 847 has a function of generating an input signal used by a user for performing a desired operation. For example, the operation section 847 may be configured from, for example, an input section for inputting information by the user, such as a touch sensor, a mouse, a keyboard, a button, a microphone, a switch, and a lever, and an input control circuit which generates an input signal based on the input by the user and outputs the generated input signal to the CPU 839.

(Display Section 849)

The display section 849 is an example of an output device, and may be a liquid crystal display (LCD) device, an organic light emitting diode (OLED) display device, or the like. The display section 849 displays a screen to the user, and thereby being able to provide information.

(Decoder 851, Speaker 853)

The decoder 851 has a function of performing decoding, analog conversion, and the like of input data in accordance with the control of the CPU 839. The decoder 851 can perform decoding, analog conversion, and the like of audio data input through the telephone network antenna 817 and the telephone processing section 819, and can output an audio signal to the speaker 853, for example. Further, the decoder 851 can perform decoding, analog conversion, and the like of audio data input through the WiFi antenna 825 and the WiFi processing section 827, and can output an audio signal to the speaker 853, for example. The speaker 853 can output the audio based on the audio signal supplied from the decoder 851.

(Encoder 855, Microphone 857)

The encoder 855 has a function of performing digital conversion, encoding, and the like of input data in accordance with the control of the CPU 839. The encoder 855 can perform digital conversion, encoding, and the like of an audio signal input from the microphone 857, and can output audio data. The microphone 857 can collect audio and output the audio as an audio signal.

(Storage Section 859)

The storage section 859 is a device for storing data, and can include a storage medium, a recording device for recording data in the storage medium, a reading device for reading the data from the storage medium, and a deletion device for deleting the data recorded in the storage medium. Here, as the storage medium, there may be used a non-volatile memory such as a flash memory, a magnetoresistive random access memory (MRAM), a ferroelectric random access memory (FeRAM), a phase change random access memory (PRAM), and an electronically erasable and programmable read only memory (EEPROM), and a magnetic recording medium such as a hard disk drive (HDD).

[5-2. Hardware Configuration Example]

Figure 26:
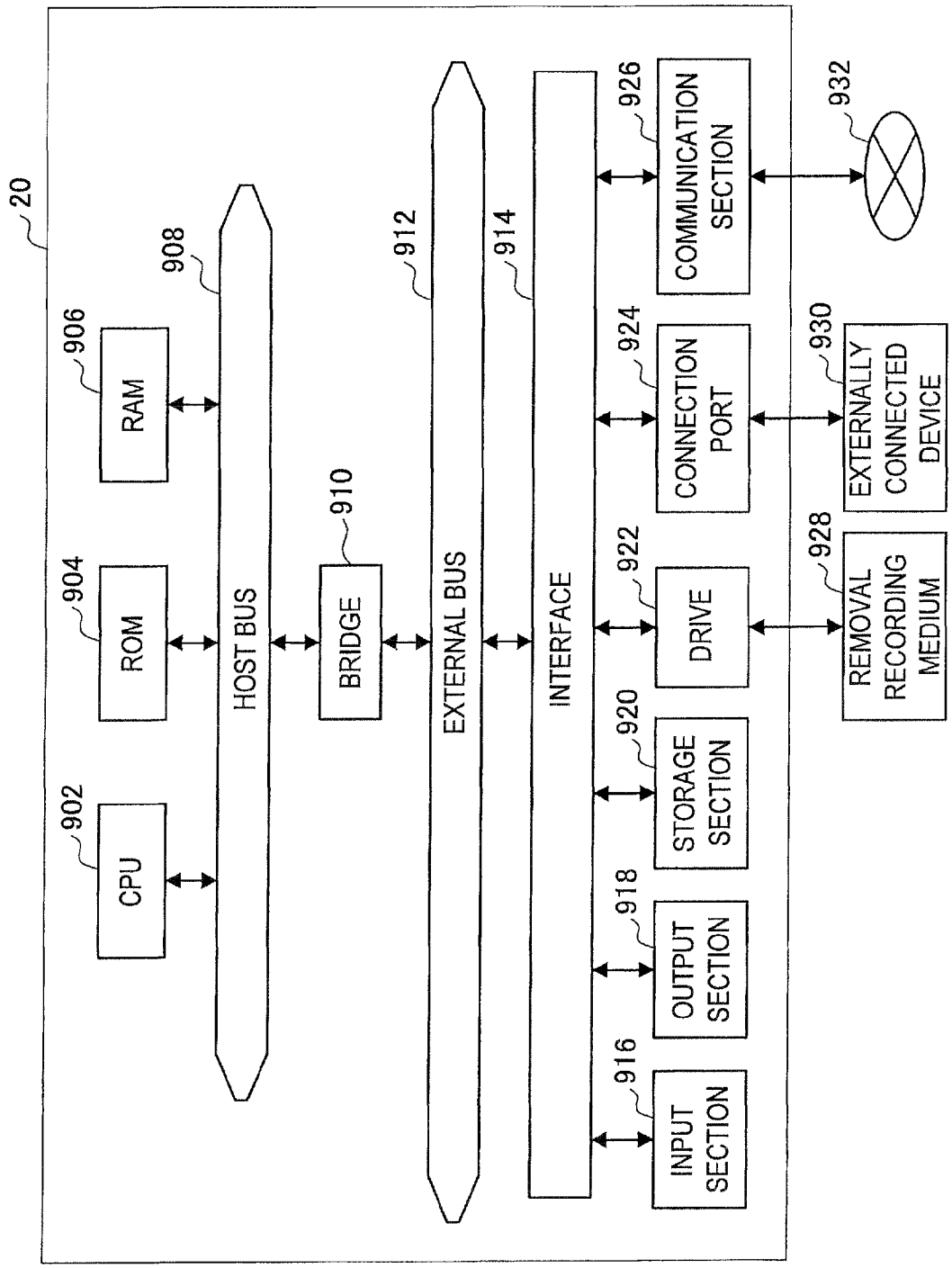
FIG. 26 is a block diagram showing a hardware configuration of the server device according to the present embodiment.

The function of each structural element of the server device 20 and the terminal device 200 described above can be realized by using the hardware configuration shown in FIG. 26, for example. That is, the function of each structural element is realized by controlling the hardware shown in FIG. 26 by using a computer program. Note that the mode of this hardware is arbitrary, and may be a personal computer, a mobile information terminal such as a mobile phone, a PHS or a PDA, a game machine, or various types of information appliances. "PHS" is an abbreviation for "personal handy-phone system". Further, "PDA" is an abbreviation for "personal digital assistant". FIG. 26 is a block diagram showing an example of a hardware configuration of the server device according to the embodiment.

As shown in FIG. 26, the hardware mainly includes a CPU 902, a ROM 904, a RAM 906, a host bus 908, and a bridge 910. In addition, the hardware includes an external bus 912, an interface 914, an input section 916, an output section 918, a storage section 920, a drive 922, a connection port 924, and a communication section 926. Note that "CPU" is an abbreviation for "central processing section". Further, "ROM" is an abbreviation for "read only memory". Still further, "RAM" is an abbreviation for "random access memory".

The CPU 902 functions as an arithmetic processing section or a control section, and controls the overall operation or a part of the operation of each structural element based on various programs recorded in the ROM 904, the RAM 906, the storage section 920, or a removable recording medium 928. The ROM 904 is a section for storing a program to be read by the CPU 902, data used for calculation, and the like. The RAM 906 temporarily or permanently stores a program to be read by the CPU 902, various parameters that appropriately change when executing the program, and the like.

Those structural elements are connected to each other via, for example, the host bus 908 capable of performing high-speed data transmission. On the other hand, the host bus 908 is connected via the bridge 910 to the external bus 912 whose data transmission speed is relatively low, for example. Further, as the input section 916, there are used a mouse, a keyboard, a touch panel, a button, a switch, or a lever, for example. Also, the input section 916 may be a remote control that can transmit a control signal by using an infrared ray or other radio waves.

The output section 918 is, for example, a display device such as a CRT, an LCD, a PDP, or an ELD, an audio output device such as a speaker or headphones, a printer, a mobile phone, or a facsimile, that can visually or auditorily notify a user of acquired information. Note that, "CRT" is an abbreviation for "cathode ray tube". Further, "LCD" is an abbreviation for "liquid crystal display". Still further, "PDP" is an abbreviation for "plasma display panel". Also, "ELD" is an abbreviation for "electro-luminescence display".

The storage section 920 is a device for storing various data. The storage section 920 is, for example, a magnetic storage device such as an HDD, a semiconductor storage device, an optical storage device, or a magneto-optical storage device. Note that "HDD" is an abbreviation for "hard disk drive".

The drive 922 is a device that reads information recorded on the removal recording medium 928 such as a magnetic disk, an optical disc, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card having a non-contact IC chip mounted thereon or an electronic device. Note that "IC" is an abbreviation for "integrated circuit".

The connection port 924 is a port such as an USB port, an IEEE 1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Note that "USB" is an abbreviation for "universal serial bus". Also, "SCSI" is an abbreviation for "small computer system interface".

The communication section 926 is a communication device to be connected to the network 932, and is, for example, a communication card for a wired or wireless LAN, Bluetooth (registered trademark), or WUSB, an optical communication router, an ADSL router, or various communication modems. The network 932 connected to the communication section 926 is configured from a wire-connected or wirelessly connected network, and is the Internet, a home-use LAN, infrared communication, visible light communication, broadcasting, or satellite communication, for example. Note that "LAN" is an abbreviation for "local area network". Also, "WUSB" is an abbreviation for "wireless USB". Further, "ADSL" is an abbreviation for "asymmetric digital subscriber line".

It should be understood by those skilled in the art that various modifications, combinations, sub-combinations and alterations may occur depending on design requirements and other factors insofar as they are within the scope of the appended claims or the equivalents thereof.

For example, the above described embodiments, the GPS has been described as an example of the positioning satellite, but the technical scope of the present disclosure is not limited to this example. For example, the portable terminal 10 may have a positioning function using a positioning satellite other than the GPS. An example of the positioning satellite other than the GPS may include GALILEO, GLONASS, HOKUTO, and MICHIBIKI, etc. In this case, one satellite may be used as the positioning satellite, or positioning signals from plural satellites may be used in combination thereof. The configuration of the structural elements to be used for acquiring the positional information may be appropriately changed in accordance with the technical level at the time of using the positioning satellite.

In the above embodiment, the hardware configuration of the portable terminal 10 has been explained by using an example of the hardware configuration of the smart phone having a telephone function and a communicating function, but the technical scope of the present disclosure is not limited to this example. In the above description, the device for learning the correspondence between the traveling pitch and the speed, and the device for using this correspondence have been described as one identical device, but the technical scope of the present disclosure is not limited to this example. For example, they may be embodied as functions of separate devices.

Note that, in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

Additionally, the present technology may also be configured as below.

(1) An information processing apparatus including:
   a traveling pitch acquiring section configured to acquire a current traveling pitch; and
   a speed acquiring section configured to acquire a current traveling speed extracted from an association table showing correspondence between a traveling pitch and a traveling speed based on the current traveling pitch.

(2) The information processing apparatus according to (1), wherein
   the association table is information generated by use of the traveling speed calculated based on a received signal from a positioning satellite.

(3) The information processing apparatus according to (2), wherein
   the association table is information generated based on the traveling pitch and the traveling speed acquired by a plurality of users.

(4) The information processing apparatus according to any one of (1) to (3), further including
   a traveling mode acquiring section configured to acquire a traveling mode, wherein
   the speed acquiring section acquires the traveling speed extracted based on the traveling mode.

(5) The information processing apparatus according to (4), wherein
the traveling mode acquiring section determines whether or not the traveling mode is a running mode based on swing detecting data.
(6) The information processing apparatus according to (4) or (5), wherein
the traveling mode acquiring section determines whether or not the traveling mode is a display screen watching mode based on at least one of a posture of the information processing apparatus and an operating status of a display screen of the information processing apparatus.
(7) The information processing apparatus according to any one of (1) to (6), further including
a position calculating section for calculating a current position by use of the extracted traveling speed.
(8) The information processing apparatus according to any one of (1) to (7), wherein
the association table further includes an index of precision for the traveling speed, and
the speed acquiring section acquires the index of precision for the current traveling speed.
(9) The information processing apparatus according to (8), wherein
the index of precision is information calculated based on sample data regarding the traveling pitch and the traveling speed that are used for generating the association table.
(10) The information processing apparatus according to (8) or (9), wherein
the index of precision is information calculated based on a number of pieces of the sample data.
(11) The information processing apparatus according to any one of (1) to (10), further including
a distance calculating section for calculating a traveling distance by use of the extracted traveling speed.
(12) The information processing apparatus according to any one of (1) to (11), further including
an active mass calculating section for calculating a traveling distance by use of the extracted traveling speed, and calculating an active mass based on the calculated traveling distance.
(13) The information processing apparatus according to any one of (1) to (12), further including
a satellite positioning section for tracking a positioning satellite based on a traveling orientation and the extracted traveling speed.
(14) The information processing apparatus according to any one of (1) to (13), wherein
the speed acquiring section acquires the traveling speed extracted from the association table if the traveling speed is unavailable from the satellite positioning section.
(15) An information processing method including:
acquiring a current traveling pitch; and
acquiring a current traveling speed extracted from an association table showing correspondence between a traveling pitch and a traveling speed based on the current traveling pitch.
(16) A program allowing a computer to function as an information processing apparatus, the information processing apparatus including:
a traveling pitch acquiring section configured to acquire a current traveling pitch; and
a speed acquiring section configured to acquire a current traveling speed extracted from an association table showing correspondence between a traveling pitch and a traveling speed based on the current traveling pitch.

(17) An information processing apparatus including:
a traveling pitch acquiring section configured to acquire a traveling pitch;
a speed acquiring section configured to acquire a traveling speed calculated by use of a positioning satellite; and
a table generating section configured to generate an association table showing correspondence between the traveling pitch and the traveling speed.
(18) An information processing method including:
acquiring a traveling pitch;
acquiring a traveling speed calculated by use of a positioning satellite; and
generating an association table showing correspondence between the traveling pitch and the traveling speed.
(19) A program allowing a computer to function as an information processing apparatus, the information processing apparatus including:
a traveling pitch acquiring section configured to acquire a traveling pitch;
a speed acquiring section configured to acquire a traveling speed calculated by use of a positioning satellite; and
a table generating section configured to generate an association table showing correspondence between the traveling pitch and the traveling speed.

The present disclosure contains subject matter related to that disclosed in Japanese Priority Patent Application JP 2012-080989 filed in the Japan Patent Office on Mar. 30, 2012, the entire content of which is hereby incorporated by reference.

What is claimed is:
1. A mobile device including an information processing apparatus for determining a user's position comprising:
a traveling pitch acquiring section responsive to position sensing signals representing the position of a user of the mobile device and to acceleration sensing signals representing movement of the user, the traveling pitch acquiring section acquiring a current traveling pitch of the user representing steps of the user per time interval;
a traveling mode acquiring section configured to acquire a traveling mode of the user, including whether the user's traveling mode is a running mode or a walking mode based on the acceleration sensing signals;
a traveling pitch to speed table storing, for the respective traveling modes correspondence between traveling pitches of the user acquired by the traveling pitch acquiring section and speed determined from the position sensing signals, the traveling pitch to speed table including an index of precision for the traveling speed calculated from sample data regarding the traveling pitch and the traveling speed used for generating the traveling pitch to speed table;
a speed acquiring section configured to acquire the index of precision for the current traveling speed and a current traveling speed of the user extracted from the traveling pitch to speed table based on the current traveling pitch and corresponding to the user's acquired traveling mode; and
a position calculating section for calculating a current position of the user based on the extracted traveling speed.
2. The mobile information processing apparatus according to claim 1, wherein
the position sensing signals are based on a received signal from a positioning satellite.
3. The mobile information processing apparatus according to claim 2, wherein the traveling pitch to speed table stores correspondence between traveling pitches and speed based on the traveling pitch and the traveling speed acquired by a plurality of users.

4. The mobile information processing apparatus according to claim 1, wherein
the traveling mode acquiring section determines whether or not the traveling mode is a display screen watching mode based on at least one of a posture of the information processing apparatus and an operating status of a display screen of the information processing apparatus.

5. The mobile information processing apparatus according to claim 1, wherein
the index of precision is calculated from a number of pieces of the sample data.

6. The mobile information processing apparatus according to claim 1, further comprising
a distance calculating section for calculating a traveling distance based on the extracted traveling speed.

7. The mobile information processing apparatus according to claim 1, further comprising
an active mass calculating section for calculating a traveling distance based on the extracted traveling speed, and calculating an active mass based on the calculated traveling distance.

8. The mobile information processing apparatus according to claim 1, further comprising
a satellite positioning section for tracking a positioning satellite based on a traveling orientation and the extracted traveling speed.

9. The mobile information processing apparatus according to claim 8, wherein
the speed acquiring section acquires the traveling speed extracted from the traveling pitch to speed table if the traveling speed is unavailable from the satellite positioning section.

10. An information processing method for determining a user's position comprising:
acquiring a current traveling pitch of a user, representing steps of the user per time interval, in response to position sensing signals representing the position of the user and to acceleration sensing signals representing movement of the user;
acquiring a traveling mode of the user, including whether the user's traveling mode is a running mode or a walking mode based on the acceleration sensing signals;
storing in a traveling pitch to speed table, for the respective traveling modes, correspondence between the acquired traveling pitches of the user and speed determined from the position sensing signals, the traveling pitch to speed table including an index of precision for the traveling speed calculated from sample data regarding the traveling pitch and the traveling speed used for generating the traveling pitch to speed table;
acquiring the index of precision for the current traveling speed and a current traveling speed of the user extracted from the correspondence between the travelling pitch and the speed based on the current traveling pitch and corresponding to the user's acquired traveling mode; and
calculating a current position of the user based on the extracted traveling speed.

11. A non-transitory computer readable storage medium storing a program that, when executed, by a computer, causes the computer to function as a mobile information processing apparatus to determine a user's position, including:
a traveling pitch acquiring section responsive to position sensing signals representing the position of a user and to acceleration sensing signals representing movement of the user, the traveling pitch acquiring section acquiring a current traveling pitch of the user representing steps of the user per time interval;
a traveling mode acquiring section configured to acquire a traveling mode of the user, including whether the user's traveling mode is a running mode or a walking mode based on the acceleration sensing signals;
a traveling pitch to speed table storing, for the respective traveling modes, correspondence between traveling pitches of the user acquired by the traveling pitch acquiring section and speed determined from the position sensing signals, the traveling pitch to speed table including an index of precision for the traveling speed calculated from sample data regarding the traveling pitch and the traveling speed used for generating the traveling pitch to speed table;
a speed acquiring section configured to acquire the index of precision for the current traveling speed and a current traveling speed of the user extracted from the traveling pitch to speed table based on the current traveling pitch and corresponding to the user's acquired traveling mode; and
a position calculating section for calculating a current position of the user based on the extracted traveling speed.

* * * * *